(12) United States Patent
Kawata et al.

(10) Patent No.: US 8,257,822 B2
(45) Date of Patent: Sep. 4, 2012

(54) FILM FOR THERMAL STERILIZATION PACKAGING

(75) Inventors: Mitsuo Kawata, Sodegaura (JP); Jun Birukawa, Ichihara (JP); Kunihiko Takesue, Chiba (JP); Keita Itakura, Ichihara (JP); Tokutaro Kimura, Ichihara (JP)

(73) Assignees: Mitsui Chemicals, Inc., Tokyo (JP); Prime Polymer Co., Ltd., Tokyo (JP)

( * ) Notice: Subject to any disclaimer, the term of this patent is extended or adjusted under 35 U.S.C. 154(b) by 230 days.

(21) Appl. No.: 12/735,686

(22) PCT Filed: Feb. 6, 2009

(86) PCT No.: PCT/JP2009/052102
§ 371 (c)(1),
(2), (4) Date: Aug. 6, 2010

(87) PCT Pub. No.: WO2009/099213
PCT Pub. Date: Aug. 13, 2009

(65) Prior Publication Data
US 2010/0310842 A1 Dec. 9, 2010

(30) Foreign Application Priority Data
Feb. 8, 2008 (JP) .................................. 2008-028756

(51) Int. Cl.
*B32B 7/02* (2006.01)
*B32B 27/32* (2006.01)
(52) U.S. Cl. ....................................... 428/213; 428/220
(58) Field of Classification Search .................. 428/213, 428/523
See application file for complete search history.

(56) References Cited

U.S. PATENT DOCUMENTS

| | | |
|---|---|---|
| 3,265,765 A | 8/1966 | Holden et al. |
| 3,333,024 A | 7/1967 | Haefele et al. |
| 3,465,063 A | 9/1969 | Hassell et al. |
| 5,322,902 A | 6/1994 | Schreck et al. |
| 6,770,723 B2 | 8/2004 | Fujita et al. |
| 6,875,718 B2 | 4/2005 | Fujita et al. |
| 6,939,928 B1 | 9/2005 | Kawai et al. |
| 7,300,903 B2 | 11/2007 | Fujita et al. |
| 7,449,533 B2 | 11/2008 | Kawai et al. |
| 2005/0009993 A1 | 1/2005 | Morioka et al. |
| 2008/0038498 A1* | 2/2008 | Itakura et al. ................. 428/35.7 |
| 2008/0220193 A1* | 9/2008 | Tohi et al. .................. 428/36.92 |
| 2010/0227991 A1* | 9/2010 | Matsunaga et al. ........... 526/172 |
| 2011/0172353 A1* | 7/2011 | Matsunaga et al. ........... 524/579 |

FOREIGN PATENT DOCUMENTS

| | | |
|---|---|---|
| GB | 1020720 A | 2/1966 |
| JP | 40-23798 B | 10/1965 |
| JP | 42-08704 B | 4/1967 |
| JP | 43-06636 | 3/1968 |
| JP | 46-020814 | 6/1971 |
| JP | 61-139441 | 6/1986 |
| JP | 05-202152 | 8/1993 |
| JP | 08-238732 | 9/1996 |
| JP | 11-091046 | 4/1999 |
| JP | 11-315109 A | 11/1999 |
| JP | 11-349649 | 12/1999 |
| JP | 2003-206325 | 7/2003 |
| JP | 2004-358683 | 12/2004 |
| JP | 2004358683 A * | 12/2004 |
| JP | 2005-271339 | 10/2005 |
| JP | 2005-298706 | 10/2005 |
| JP | 2006-188600 A | 7/2006 |
| JP | 2006188600 A * | 7/2006 |
| JP | 2007-045048 A | 2/2007 |
| JP | 2007045048 A * | 2/2007 |
| JP | 2008024751 A * | 2/2008 |
| WO | WO 01/27124 A1 | 4/2001 |
| WO | WO-2006/068308 A1 | 6/2006 |

OTHER PUBLICATIONS

International Search Report in PCT/JP2009/052102 dated Mar. 10, 2009.

* cited by examiner

*Primary Examiner* — David Sample
*Assistant Examiner* — Tahseen N Khan
(74) *Attorney, Agent, or Firm* — Foley & Lardner LLP

(57) ABSTRACT

Provided is a film for thermal sterilization packaging which is excellent in a total balance of characteristics such a transparency, an impact resistance, a heat sealing property, a blocking resistance, a heat resistance and the like.

The film for thermal sterilization packaging according to the present invention is characterized by comprising:

an outer layer containing a propylene/ethylene block copolymer (A) which has a melt flow rate (MFR; ASTM D1238, 230° C., load: 2.16 kg) in the range of 1 to 10 g/10 minutes and a melting point in the range of 150 to 170° C. measured by means of a differential scanning colorimeter. (DSC) and which is constituted from 90 to 80% by weight of a part ($D_{insol}$) insoluble in n-decane at room temperature satisfying the specific requisites and 10 to 20% by weight of a part ($D_{sol}$) soluble in n-decane at room temperature satisfying the specific requisites and an intermediate layer or an outer layer containing a propylene/ethylene block copolymer (B) which is not the same as the above propylene/ethylene block copolymer (A).

20 Claims, No Drawings

FILM FOR THERMAL STERILIZATION PACKAGING

FIELD OF THE INVENTION

The present invention relates to a film for thermal sterilization packaging which is excellent in a total balance of characteristics such a transparency, a sealing strength, a heat resistance, an impact resistance, a blocking resistance and the like.

RELATED ART

In recent years, thermal sterilization treatment is carried out from the viewpoint of a safety and a sanitary property when medicines, foods and the like are packaged in film vessels. For example, foods are filled in film vessels, completely sealed therein, subjected to sterilization treatment (called retort treatment) and retort foods are stored in a sterile condition until the foods are consumed.

Thermal sterilization treatment is carried out usually by heating medicines or foods filled in film vessels and completely sealed therein at high temperature for certain time. In general, polyethylene or polypropylene resins are used in a part brought into contact with medicines or foods in film vessels. A heat resistance and an impact resistance are required to the resins used in the part brought into contact with medicines or foods in the above film vessels, and therefore propylene block copolymers are principally used therefor.

In recent years, thermal sterilizing packages which can endure thermal sterilization treatment at high temperature and whose contents can be confirmed and which have an impact strength equivalent to those of thermal sterilizing packages prepared by using existing propylene block copolymers are required due to a rise in consumer concern on a safety of medicines or preserved foods.

Various films for thermal sterilization packaging have so far been proposed in order to obtain thermal sterilizing packages satisfying the above requirement (refer to, for example, patent documents 1 to 3), but films which are well balanced and excellent in all requirements to a transparency, a sealing strength, a blocking resistance, a heat resistance and an impact resistance have not yet been obtained.

Patent document 1: Japanese Patent Application Laid-Open No. 358683/2004
Patent document 2: Japanese Patent Application Laid-Open No. 45048/2007
Patent document 3: Japanese Patent Application Laid-Open No. 188600/2006

DISCLOSURE OF THE INVENTION

Problem to be Solved by the Invention

An object of the present invention is to provide a film for thermal sterilization packaging which is excellent in a total balance of characteristics such a transparency, a sealing strength, a blocking resistance, a heat resistance, an impact resistance and the like.

Means to Solve the Problem

Intensive researches repeated by the present inventors in order to solve the problems described above have resulted in finding that an excellent total balance of characteristics such a transparency, a sealing strength, a blocking resistance, a heat resistance, an impact resistance and the like is provided by using a specific propylene/ethylene block copolymer (A) for a film for thermal sterilization packaging, and thus they have come to complete the present invention.

That is, the present invention is specified by an item described below.

The film for thermal sterilization packaging according to the present invention is characterized by comprising: at least one outer layer containing a propylene/ethylene block copolymer (A) which has a melt flow rate (MFR; ASTM D1238, 230° C., load: 2.16 kg) in the range of 1 to 10 g/10 minutes and a melting point in the range of 150 to 170° C. measured by means of a differential scanning colorimeter (DSC) and which is constituted from 90 to 80% by weight of a part ($D_{insol}$) insoluble in n-decane at room temperature satisfying the following items (1) to (3) and 10 to 20% by weight of a part ($D_{sol}$) soluble in n-decane at room temperature satisfying the following items (4) to (6) and at least one intermediate layer or an outer layer containing a propylene/ethylene block copolymer (B) which is not the same as the above propylene/ethylene block copolymer (A).

(1) A molecular weight distribution (Mw/Mn) of $D_{insol}$ determined by GPC (gel permeation chromatography) is 3.5 or less,
(2) a content of a skeleton originating in ethylene in $D_{insol}$ is less than 13 mole %,
(3) a sum of a 2,1-insertion bond amount and a 1,3-insertion bond amount of propylene in $D_{insol}$ is 0.2 mole % or less,
(4) a molecular weight distribution (Mw/Mn) of $D_{sol}$ determined by GPC is 3.5 or less,
(5) a limiting viscosity [η] of $D_{sol}$ in 135° C. decalin is 1.5 to 4.0 dl/g and
(6) a content of a skeleton originating in ethylene in $D_{sol}$ is 15 to 35 mole %

Also, the propylene/ethylene block copolymer (B) has preferably a melt flow rate (MFR; ASTM D1238, 230° C., load: 2.16 kg) in the range of 1 to 10 g/10 minutes and a melting point in the range of 140 to 170° C., and it is constituted preferably from 90 to 70% by weight of a part ($D_{insol}$) insoluble in n-decane at room temperature which satisfies the following items (i) to (iii) and 10 to 30% by weight of a part ($D_{sol}$) soluble in n-decane at room temperature which satisfies the following items (iv) to (vi).

(i) A molecular weight distribution (Mw/Mn) of $D_{insol}$ determined by GPC (gel permeation chromatography) is 3.5 or less,
(ii) a content of a skeleton originating in ethylene in $D_{insol}$ is less than 13 mole %,
(iii) a sum of a 2,1-insertion bond amount and a 1,3-insertion bond amount of propylene in $D_{insol}$ is 0.2 mole % or less,
(iv) a molecular weight distribution (Mw/Mn) of $D_{sol}$ determined by GPC is 3.5 or less,
(v) a limiting viscosity [η] of $D_{sol}$ in 135° C. decalin is 1.5 to 4.0 dl/g and
(vi) a content of a skeleton originating in ethylene in $D_{sol}$ is 15 to 45 mole %

Also, the film for thermal sterilization packaging according to the present invention further satisfies preferably the following item (a):
(a) a content (mole %) of the skeleton originating in ethylene in $D_{sol}$ of the propylene/ethylene block copolymer (B)>a content (mole %) of the skeleton originating in ethylene in $D_{sol}$ of the propylene/ethylene block copolymer (A).

One embodiment of the film for thermal sterilization packaging according to the present invention includes a film comprising the outer layer containing the propylene/ethylene block copolymer (A) and another outer layer containing the propylene/ethylene block copolymer (B). In the above embodiment, a proportion of a thickness of the outer layer containing the propylene/ethylene block copolymer (A) is preferably 10 to 50%, and a proportion of a thickness of another outer layer containing the propylene/ethylene block copolymer (B) is preferably 50 to 90% based on a whole thickness of the film for thermal sterilization packaging (provided that the total of the proportions of the thicknesses of both layers is 100%).

Further, a different embodiment of the film for thermal sterilization packaging according to the present invention includes a film comprising the outer layer containing the propylene/ethylene block copolymer (A), at least one intermediate layer containing the propylene/ethylene block copolymer (B) and another outer layer containing the propylene/ethylene block copolymer (A) or the propylene/ethylene block copolymer (B). In the above embodiment, a proportion of a thickness of the outer layer containing the propylene/ethylene block copolymer (A) is preferably 10 to 30%; a proportion of a thickness (when two or more intermediate layers are present, a total thickness thereof) of the intermediate layer containing the propylene/ethylene block copolymer (B) is preferably 40 to 80%; and a proportion of a thickness of another outer layer containing the propylene/ethylene block copolymer (A) or the propylene/ethylene block copolymer (B) is preferably 10 to 30% to a whole thickness of the film for thermal sterilization packaging (provided that the total of the proportions of the thicknesses of all layers is 100%).

Also, the film for thermal sterilization packaging according to the present invention has preferably a haze of 15% or less measured according to ASTM D-1003 using a test piece of the film for thermal sterilization packaging having a thickness of 70 μm.

Further, in the film for thermal sterilization packaging according to the present invention, the propylene/ethylene block copolymer (A) and/or (B) are prepared preferably by polymerization under the presence of a metallocene catalyst.

Effect of the Invention

The film for thermal sterilization packaging according to the present invention is excellent particularly in a transparency and provided as well with an impact resistance by using the specific propylene/ethylene block copolymer (A), and therefore it is suitably used for thermal sterilization packaging. The film for thermal sterilization packaging according to the present invention has low bleeding and is excellent as well in a sanitary property, and therefore it improves the taste of the foods.

BEST MODE FOR CARRYING OUT THE INVENTION

The film for thermal sterilization packaging according to the present invention shall be explained below in detail.

The specific propylene/ethylene block copolymers (A) and (B) used for the film for thermal sterilization packaging according to the present invention shall be explained.
<Propylene/Ethylene Block Copolymer (A)>

The propylene/ethylene block copolymer (A) used in the present invention has a melt flow rate (MFR; ASTM D1238, 230° C., load: 2.16 kg) in the range of 1 to 10 g/10 minutes, preferably 1.5 to 5 g/10 minutes and a melting point in the range of 150 to 170° C., preferably 150 to 165° C. and more preferably 156 to 165° C., and it is constituted from 90 to 80% by weight of a part ($D_{insol}$) insoluble in n-decane at room temperature and 10 to 20% by weight of a part ($D_{sol}$) soluble in n-decane at room temperature. In this regard, a melt flow rate (MFR; ASTM D1238, 230° C., load: 2.16 kg), a melting point, a weight ratio of the part ($D_{insol}$) insoluble in n-decane at room temperature and a weight ratio of the part ($D_{sol}$) soluble in n-decane at room temperature in the propylene/ethylene block copolymer (A) can suitably be changed by selecting a polymerization catalyst and polymerization conditions each described later. In the present invention, the melting point is a value measured by means of a differential scanning colorimeter (DSC, manufactured by PerkinElmer Co., Ltd.).

In the propylene/ethylene block copolymer (A), $D_{insol}$ satisfies the requisites (1) to (3), and $D_{sol}$ satisfies the requisites (4) to (6).

(1) A molecular weight distribution (Mw/Mn) of $D_{insol}$ determined by GPC is 3.5 or less, preferably 1.5 to 3.3, (2) a content of a skeleton originating in ethylene in $D_{insol}$ is less than 13 mole %, (3) a sum of a 2,1-insertion bond amount and a 1,3-insertion bond amount of propylene in $D_{insol}$ is 0.2 mole % or less, (4) a molecular weight distribution (Mw/Mn) of $D_{sol}$ determined by GPC is 3.5 or less, preferably, 1.5 to 3.3, (5) a limiting viscosity [η] of $D_{sol}$ in 135° C. decalin is 1.5 to 4.0 dl/g, preferably 1.5 to 3.0 dl/g and more preferably 1.8 to 2.8 dl/g and (6) a content of a skeleton originating in ethylene in $D_{sol}$ is 15 to 35 mole %, preferably 15 to 25 mole %

<Propylene/Ethylene Block Copolymer (B)>

The suitable propylene/ethylene block copolymer (B) used in the present invention has a melt flow rate (MFR; ASTM D1238, 230° C., load: 2.16 kg) in the range of 1 to 10 g/10 minutes, preferably 1.5 to 5 g/10 minutes and a melting point in the range of 140 to 170° C., preferably 145 to 170° C. and more preferably 146 to 165° C., and it is constituted preferably from 90 to 70% by weight of a part ($D_{insol}$) insoluble in n-decane at room temperature and 10 to 30% by weight of a part ($D_{sol}$) soluble in n-decane at room temperature. In this regard, a melt flow rate (MFR; ASTM D1238, 230° C., load: 2.16 kg), a melting point, a weight ratio of the part ($D_{insol}$) insoluble in n-decane at room temperature and a weight ratio of the part ($D_{sol}$) soluble in n-decane at room temperature in the propylene/ethylene block copolymer (B) can suitably be changed by selecting a polymerization catalyst and polymerization conditions each described later.

In the propylene/ethylene block copolymer (B), $D_{insol}$ satisfies preferably the requisites (i) to (iii), and $D_{sol}$ satisfies preferably the requisites (iv) to (vi).

(i) A molecular weight distribution (Mw/Mn) of $D_{insol}$ determined by GPC is 3.5 or less, preferably 1.5 to 3.3, (ii) a content of a skeleton originating in ethylene in $D_{insol}$ is less than 13 mole %, (iii) a sum of a 2,1-insertion bond amount and a 1,3-insertion bond amount of propylene in $D_{insol}$ is 0.2 mole % or less, (iv) a molecular weight distribution (Mw/Mn) of $D_{sol}$ determined by GPC is 3.5 or less, preferably 1.5 to 3.3, (v) a limiting viscosity [η] of $D_{sol}$ in 135° C. decalin is 1.5 to 4.0 dl/g, preferably 2.0 to 3.5 dl/g and more preferably 2.0 to 3.0 dl/g and (vi) a content of a skeleton originating in ethylene in $D_{sol}$ is 15 to 45 mole %, preferably 20 to 40 mole % and more preferably 25 to 40 mole %

Further, the propylene/ethylene block copolymers (A) and (B) further satisfy preferably the following requisite (a) in addition to the requisites described above.

(a) A content (mole %) of the skeleton originating in ethylene in $D_{sol}$ of the propylene/ethylene block copolymer (B)>a content (mole %) of the skeleton originating in ethylene in $D_{sol}$ of the propylene/ethylene block copolymer (A)

The requisites (1) to (6), (i) to (vi) and (a) which are provided in the propylene/ethylene block copolymer (A) and the preferred propylene/ethylene block copolymer (B) shall be explained below in detail.

Requisites (1) and (i):

A molecular weight distribution (Mw/Mn) of the part $(D_{insol})$ insoluble in n-decane at room temperature determined by GPC (gel permeation chromatography) in the propylene/ethylene block copolymer (A) or (B) used in the present invention is 3.5 or less, preferably 1.5 to 3.3 and more preferably 1.8 to 2.8. A metallocene catalyst described later is preferably used as the catalyst in order to control a molecular weight distribution (Mw/Mn) of the part $(D_{insol})$ contained in the above copolymer and insoluble in n-decane at room temperature determined by GPC to the range described above. If Mw/Mn is larger than 3.5, low molecular weight components are increased, and therefore bleeding out from the film for thermal sterilization packaging according to the present invention is brought about to reduce the transparency in a certain case after heat treatment. Also, it is not preferred as well from the viewpoint of the sanitary property.

Requisites (2) and (ii):

A content of the skeleton originating in ethylene in the part $(D_{insol})$ insoluble in n-decane at room temperature in the propylene/ethylene block copolymer (A) or (B) used in the present invention is less than 13 mole %, preferably less than 8 mole %, more preferably less than 3 mole %, further preferably less than 1.5 mole % and most preferably less than 0.5 mole % If a content of the skeleton originating in ethylene in $D_{insol}$ is 13 mole % or more, the film is reduced in a transparency.

Requisites (3) and (iii):

A sum of a 2,1-insertion bond amount and a 1,3-insertion bond amount of propylene in the part $(D_{insol})$ insoluble in n-decane at room temperature in the propylene/ethylene block copolymer (A) or (B) used in the present invention is 0.2 mole % or less, preferably 0.1 mole % or less. When a sum of a 2,1-insertion bond amount and a 1,3-insertion bond amount of propylene in $D_{insol}$ is more than 0.2 mole %, a copolymerizability of propylene and ethylene is reduced, and as a result thereof, a composition distribution of a propylene/ethylene copolymer rubber in the part $(D_{sol})$ soluble in n-decane at room temperature is broadened. Accordingly, the defects that the impact resistance is reduced and that the transparency is reduced after heat treatment are brought about in a certain case.

A limiting viscosity [η] of the part $(D_{insol})$ insoluble in n-decane at room temperature in 135° C. decalin in the propylene/ethylene block copolymer (A) or (B) is usually 1.8 to 3.5 dl/g, preferably 2.0 to 2.8 dl/g.

Requisites (4) and (iv):

A molecular weight distribution (Mw/Mn) of the part $(D_{sol})$ soluble in n-decane at room temperature determined by GPC in the propylene/ethylene block copolymer (A) or (B) used in the present invention is 3.5 or less, preferably 1.5 to 3.3. A metallocene catalyst described later is suitably used as the catalyst in order to narrow, as described above, a molecular weight distribution (Mw/Mn) of the part $(D_{sol})$ of the above copolymer soluble in n-decane at room temperature determined by GPC. If Mw/Mn is larger than 3.5, a low molecular weight propylene/ethylene copolymer rubber is increased in $D_{sol}$, and therefore defects such as a reduction in the impact resistance, a deterioration in the transparency after heat treatment and blocking in storage are brought about in a certain case.

Requisites (5) and (v):

A limiting viscosity [η] in 135° C. decalin of the part $(D_{sol})$ soluble in n-decane at room temperature in the propylene/ethylene block copolymer (A) used in the present invention is 1.5 to 4.0 dl/g, preferably 1.5 to 3.0 dl/g and more preferably 1.8 to 2.8 dl/g. A limiting viscosity [η] in 135° C. decalin of the part $(D_{sol})$ soluble in n-decane at room temperature in the propylene/ethylene block copolymer (B) used in the present invention is 1.5 to 4.0 dl/g, preferably 2.0 to 3.5 dl/g and more preferably 2.0 to 3.0 dl/g. If a limiting viscosity [η] of the part $(D_{sol})$ soluble in n-decane at room temperature in the propylene/ethylene block copolymer (A) or (B) falls in the ranges described above, it is preferred in terms of the transparency and the impact strength. The propylene/ethylene block copolymer in which a limiting viscosity [η] in 135° C. decalin of the part $(D_{sol})$ soluble in n-decane at room temperature is higher than 4.0 dl/g contains a trace amount of a ultrahigh molecular weight or high ethylene amount propylene/ethylene copolymer rubber in a certain case, and the resulting film brings about a reduction in an impact resistance and defective appearance such as generation of fish eyes and the like in a certain case.

Requisites (6) and (vi):

A content of a skeleton originating in ethylene in the part $(D_{sol})$ soluble in n-decane at room temperature in the propylene/ethylene block copolymer (A) used in the present invention is 15 to 35 mole %, preferably 15 to 25 mole %. A content of a skeleton originating in ethylene in the part $(D_{sol})$ soluble in n-decane at room temperature in the propylene/ethylene block copolymer (B) used in the present invention is 15 to 45 mole %, preferably 20 to 40 mole %, more preferably 25 to 40 mole % and particularly preferably exceeding 25 mole % and 40 mole % or less. If a content of the skeleton originating in ethylene in $D_{sol}$ is lower than 15 mole %, a film prepared by the propylene/ethylene block copolymer is improved in a transparency but reduced in an impact resistance, and if it is higher than 45 mole %, the film is improved in an impact resistance but reduced in a transparency.

The film for thermal sterilization packaging according to the present invention is less liable to be reduced in a transparency and bring about a reduction in an impact resistance and makes it possible to keep a balance between a transparency and an impact resistance which is suited to the film for thermal sterilization packaging by controlling a content of the skeleton originating in ethylene in the part $(D_{sol})$ soluble in n-decane at room temperature in the propylene/ethylene block copolymers (A) and (B) to the suitable ranges described above.

Requisite (a):

In the film for thermal sterilization packaging according to the present invention, a content (mole %) of the skeleton originating in ethylene in $D_{sol}$ of the propylene/ethylene block copolymer (B) is preferably larger than a content (mole %) of the skeleton originating in ethylene in $D_{sol}$ of the propylene/ethylene block copolymer (A). Particularly, in a case of a film of a three layer constitution in which a layer containing the propylene/ethylene block copolymer (A) is set to both outer layers and in which a layer containing the propylene/ethylene block copolymer (B) is set to an intermediate layer interposed between both outer layers described above, relatively decreasing a content of the skeleton originating in ethylene in $D_{sol}$ of the propylene/ethylene block copolymer (A) at an outside and relatively increasing a content of the skeleton originating in ethylene in $D_{sol}$ of the propylene/ethylene block copolymer (B) at an inside allow both outer layers to be improved in a transparency, a heat resistance and a heat sealing property, allow the intermediate layer to be improved in an impact resistance and make it possible to obtain the film for thermal sterilization packaging which is excellent in a balance between a transparency and an impact resistance and between a heat resistance and a heat sealing property.

The propylene/ethylene block copolymers (A) and/or (B) used in the present invention are suitably propylene/ethylene block copolymers obtained by, under the presence of a metallocene catalyst, producing a propylene homopolymer or a propylene copolymer comprising propylene and a small amount of ethylene in a first polymerization step (step 1) and then copolymerizing propylene with a larger amount of ethylene than in the first polymerization step to produce a propylene/ethylene copolymer rubber in a second polymerization step (step 2).

The metallocene catalyst used in the present invention is a metallocene catalyst comprising a metallocene compound, at least one compound selected from an organic metal compound, an organic aluminumoxy compound and a compound which can be reacted with the metallocene compound to form an ion pair and, if necessary, a particulate carrier, and metallocene catalysts which can carry out stereoregular polymerization for an isotactic or syndiotactic structure can preferably be listed. Among the metallocene compounds, a cross-linking metallocene compound shown below which is shown as an example in an international application (WO01/27124) filed by the present inventors is used.

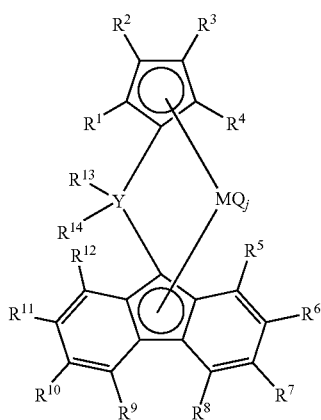

[I]

In Formula [I] described above, $R^1$, $R^2$, $R^3$, $R^9$, $R^5$, $R^6$, $R^7$, $R^8$, $R^9$, $R^{10}$, $R^{11}$, $R^{12}$, $R^{13}$ and $R^{14}$ are selected from a hydrogen atom, a hydrocarbon group and a silicon-containing group and may be the same as or different from each other. The above hydrocarbon groups include linear hydrocarbon groups such as methyl, ethyl, n-propyl, allyl, n-butyl, n-pentyl, n-hexyl, n-heptyl, n-octyl, n-nonyl, n-decanyl; branched hydrocarbon groups such as isopropyl, tert-butyl, amyl, 3-methylpentyl, 1,1-diethypropyl, 1,1-dimethybutyl, 1-methyl-1-propylbutyl, 1,1-propylbutyl, 1,1-dimethy-2-methylpropyl and 1-methyl-1-isopropyl-2-methylpropyl; cyclic saturated hydrocarbon groups such as cyclopentyl, cyclohexyl, cycloheptyl, cyclooctyl, norbornyl and adamantyl; cyclic unsaturated hydrocarbon groups such as phenyl, tolyl, naphthyl, biphenyl, phenanthryl and anthracenyl; saturated hydrocarbon groups substituted with cyclic unsaturated hydrocarbon groups, such as benzyl, cumyl and 1,1-diphenylethyl, triphenylmethyl; and hetero atom-containing hydrocarbon groups such as methoxy, ethoxy, phenoxy, furyl, N-methylamino, N,N-dimethylamino, N-phenylamino, pyrryl and thienyl. The silicon-containing groups include trimethylsilyl, triethylsilyl, dimethylphenylsilyl, diphenylmethylsilyl, triphenylsilyl.

In Formula [I], the substituents $R^5$ to $R^{12}$ may be combined mutually with the adjacent substituents to form rings. Such substituted fluorenyl groups include benzofluorenyl, dibenzofluorenyl, octahydrodibenzofluorenyl, octamethyloctahydrodibenzofluorenyl, octamethyltetrahydrodicyclopentafluorenyl and the like.

In Formula [I] described above, $R^1$, $R^2$, $R^3$ and $R^4$ which are substituted on a cyclopentadienyl ring are preferably a hydrogen atom or a hydrocarbon group having 1 to 20 carbon atoms. The hydrocarbon groups described above can be shown as the examples of the hydrocarbon group having 1 to 20 carbon atoms. More preferably, $R^3$ is the hydrocarbon group having 1 to 20 carbon atoms.

In Formula [I] described above, $R^5$ to $R^{12}$ which are substituted on a fluorene ring are preferably a hydrocarbon group having 1 to 20 carbon atoms. The hydrocarbon groups described above can be shown as the examples of the hydrocarbon group having 1 to 20 carbon atoms. The substituents $R^5$ to $R^{12}$ may be combined mutually with the adjacent substituents to form rings.

In Formula [I] described above, Y which cross-links a cyclopentadienyl ring and a fluorenyl ring is preferably a 14th group element in the periodic table, and it is more preferably carbon, silicon or germanium, further preferably a carbon atom. $R^{13}$ and $R^{14}$ which are substituted on Y are preferably a hydrocarbon group having 1 to 20 carbon atoms. They may be the same as or different from each other and may be combined with each other to form a ring. The hydrocarbon groups described above can be shown as the examples of the hydrocarbon group having 1 to 20 carbon atoms. $R^{14}$ is more preferably an aryl group having 6 to 20 carbon atoms. The cyclic unsaturated hydrocarbon groups, the saturated hydrocarbon groups substituted with cyclic unsaturated hydrocarbon groups and the hetero atom-containing cyclic unsaturated hydrocarbon groups each described above can be listed as the aryl group. Also, $R^{13}$ and $R^{14}$ each may be the same or different and may be combined with each other to form a ring. Such substituents are preferably fluorenylidene, 10-hydroanthracenylidene, dibenzocycloheptadienylidene and the like.

In the metallocene compound represented by Formula [I] described above, the substituent selected from $R^1$, $R^4$, $R^5$ or $R^{12}$ may be combined mutually with $R^{13}$ or $R^{14}$ in the cross-linking part to form a ring.

In Formula [I] described above, M is preferably a 4th group transition metal in the periodic table and is more preferably Ti, Zr or Hf. Also, Q is selected in the same combination or different combinations from a halogen atom, a hydrocarbon group and an anionic ligand or a neutral ligand which can be coordinated by a lone electron pair. The term j is an integer of 1 to 4, and when j is 2 or more, Q may be the same as or different from each other. The specific examples of the halogen atom are a fluorine atom, a chlorine atom, a bromine atom and an iodine atom, and the specific examples of the hydrocarbon group include the same ones as described above. The specific examples of the anionic ligand include alkoxy groups such as methoxy, tert-butoxy and phenoxy, carboxylate groups such as acetate and benzoate, and sulfonate groups such as mesylate and tosylate. The specific examples of the neutral ligand which can be coordinated by a lone electron pair include organic phosphorus compounds such as trimethylphosphine, triethylphosphine, triphenylphosphine and diphenylmethylphosphine, and ethers such as tetrahydrofuran, diethyl ether, dioxane and 1,2-dimethoxyethane. At least one of Q is preferably a halogen atom or an alkyl group.

The above cross-linked metallocene compounds include preferably diphenylmethylene(3-tert-butyl-5-methyl-cyclopentadienyl)(fluorenyl)zirconium dichloride, diphenylmethylene(3-tert-butyl-5-methyl-cyclopentadienyl)(2,7-di-tert-butylfluorenyl)zirconium dichloride, diphenylmethylene(3-tert-butyl-5-methyl-cyclopentadienyl)(3,6-di-tert-butylfluorenyl)zirconium dichloride, (methyl)(phenyl)methylene(3-tert-butyl-5-methyl-cyclopentadienyl)(octamethyloctahydrobenzofluorenyl)zirconium dichloride, [3-(1',1',4',4',7',7',10',10'-octamethyloctahydrobenzo[b,h]fluorenyl)(1,1,3-trimethyl-5-tert-butyl-1,2,3,3a-tetrahydropentalene)]zirconium dichloride (refer to the following Formula [II]) and the like.

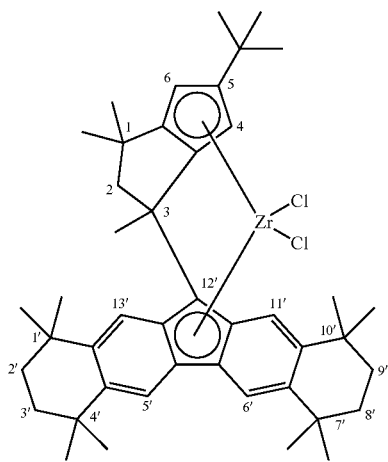

[II]

In the metallocene catalyst used in the present invention, it comprises the 4th group transition metal compound represented by Formula [I], at least one compound selected from an organic metal compound, an organic aluminumoxy compound and a compound which can be reacted with the transitional metal compound to form an ion pair and, if necessary, a particulate carrier, and compounds disclosed in the gazette described above (WO01/27124) or Japanese Patent Application Laid-Open No. 315109/1999 can be used as the above compounds without limitations.

The propylene/ethylene block copolymers (A) and/or (B) in the present invention are obtained by continuously carrying out the following two steps (a step 1 and a step 2) by means of a polymerization equipment in which two or more reaction devices are serially connected.

In the step 1, propylene is homopolymerized or propylene is copolymerized with a small amount of ethylene at a polymerization temperature of 0 to 100° C. and a polymerization pressure of atmospheric pressure to 5 MPa gauge pressure. In the step 1, a content of the skeleton originating in ethylene in $D_{insol}$ in the propylene polymer produced in the step 1 can be controlled to less than 13 mole %, preferably less than 8 mole %, more preferably less than 3 mole %, further preferably less than 1.5 mole % and most preferably less than 0.5 mole % by homopolymerizing propylene or reducing a feed amount of ethylene based on propylene.

In the step 2, propylene is copolymerized with ethylene at a polymerization temperature of 0 to 100° C. and a polymerization pressure of atmospheric pressure to 5 MPa gauge pressure. In the step 2, the propylene/ethylene copolymer rubber produced in the step 2 is grown to a principal component of $D_{insol}$ by increasing a feed amount of ethylene based on propylene.

Carrying out the above procedures makes it possible to satisfy the requisites (1) to (3) and (i) to (iii) related to $D_{insol}$ by controlling the polymerization conditions in the step 1 and satisfy the requisites (4) to (6), (iv) to (vi) and (a) related to $D_{sol}$ by controlling the polymerization conditions in the step 2.

The physical properties to be satisfied by the propylene/ethylene block copolymer (A) or (B) used in the present invention are determined in many cases by a chemical structure of the metallocene catalyst used. To be specific, a molecular weight distribution (Mw/Mn) of $D_{insol}$ determined by GPC in the requisites (1) and (i), a sum of a 2,1-insertion bond amount and a 1,3-insertion bond amount of propylene in $D_{insol}$ in the requisites (3) and (iii), a molecular weight distribution (Mw/Mn) of $D_{sol}$ determined by GPC in the requisites (4) and (iv) and a melting point of the propylene/ethylene block copolymer (A) or (B) can be controlled so that they satisfy the requisites in the present invention principally by suitably selecting the metallocene catalyst used. The metallocene catalyst preferably used in the present invention has been described above.

Further, propylene is preferably homopolymerized in the step 1 in order to control a content of the skeleton originating in ethylene in $D_{insol}$ in the requisites (2) and (ii) to the range described above, and when propylene is copolymerized with ethylene, a feed amount of ethylene is preferably reduced. A limiting viscosity [η] in 135° C. decalin of $D_{sol}$ in the requisites (5) and (v) can be controlled by a feed amount of a molecular weight controlling agent such as hydrogen and the like in the step 2. A content of the skeleton originating in ethylene in $D_{sol}$ in the requisites (6), (vi) and (a) can be controlled by a feed amount of ethylene in the step 2. Further, a composition ratio of $D_{insol}$ to $D_{sol}$ and a melt flow rate (MFR; ASTM D1238, 230° C., load: 2.16 kg) of the propylene/ethylene, block copolymer (A) or (B) can suitably be controlled by controlling an amount ratio of the polymers produced in the step 1 and the step 2.

The propylene/ethylene block copolymer (A) and/or (B) used in the present invention may be produced by producing individually the propylene polymer produced in the step 1 of the process described above and the propylene/ethylene copolymer rubber produced in the step 2 of the process described above under the presence of a metallocene compound-containing catalyst and then blending them by a physical means.

<Elastomer (E)>

An elastomer (E) can be added to the film for thermal sterilization packaging according to the present invention for the purpose of providing characteristics such as an impact resistance, a transparency and a flexibility.

Examples of the elastomer (E) include an ethylene/α-olefin random copolymer (E-a), an ethylene/α-olefin/non-conjugate polyene random copolymer (E-b), a hydrogenated block copolymer (E-c), a propylene/α-olefin copolymer (E-d), other elastic polymers and mixtures thereof.

A content of the elastomer (E) based on the film for thermal sterilization packaging according to the present invention is varied according to the characteristics provided, and it is usually 0 to 20% by weight, preferably 1 to 10% by weight.

The ethylene/α-olefin random copolymer rubber (E-a) is a random copolymer rubber of ethylene with α-olefin having 3 to 20 carbon atoms. In the ethylene/α-olefin random copolymer rubber (E-a), a mole ratio (structural unit derived from ethylene/structural unit derived from α-olefin) of a structural unit derived from ethylene to a structural unit derived from α-olefin is usually 95/5 to 15/85, preferably 80/20 to 25/75. A melt flow rate (MFR; ASTM D1238, 230° C., load: 2.16 kg)

of the ethylene/α-olefin random copolymer (E-a) falls in a range of usually 0.1 g/10 minutes or more, preferably 0.5 to 30 g/10 minutes.

The ethylene/α-olefin/non-conjugate polyene random copolymer (E-b) is a random copolymer rubber of ethylene and α-olefin having 3 to 20 carbon atoms with non-conjugate polyene. Examples of he α-olefin having 3 to 20 carbon atoms include the same ones as described above. Non-conjugated polyethylenes include non-cyclic dienes such as 5-ethylidene-2-norbornene, 5-propylidene-5-norbornene, dicyclopentadiene, 5-vinyl-2-norbornene, 5-methylene-2-norbornene, 5-isopropylidene-2-norbornene and norbornadiene; chain non-conjugated dienes such as 1,4-hexadiene, 4-methyl-1,4-hexadiene, 5-methyl-1,4-hexadiene, 5-methyl-1,5-heptadiene, 6-methyl-1,5-heptadiene,6-methyl-1,7-octadiene and 7-methyl-1,6-octadiene; trienes such as 2,3-diisopropylidene-5-norbornene. Among them, 1,4-hexadiene, dicyclopentadiene and 5-ethylidene-2-norbornene are preferably used. The ethylene/α-olefin/non-conjugated polyene random copolymer (E-b) comprises usually 94.9 to 30 mole %, preferably 89.5 to 40 mole % of a structural unit derived from ethylene, usually 5 to 45 mole %, preferably 10 to 40 mole % of a structural unit derived from α-olefin and usually 0.1 to 25 mole %, preferably 0.5 to 20 mole % of a structural unit derived from non-conjugated polyene. In the present invention, the total of the structural unit derived from ethylene, the structural unit derived from α-olefin and the structural unit derived from non-conjugated polyene is 100 mole %. A melt flow rate (MFR; ASTM D1238, 230° C., load: 2.16 kg) of the ethylene/α-olefin/non-conjugate polyene random copolymer (E-b) falls in a range of usually 0.05 g/10 minutes or more, preferably 0.1 to 30 g/10 minutes. The specific examples of the ethylene/α-olefin/non-conjugate polyene random copolymer (E-b) include ethylene/propylene/diene ternary copolymers (EPDM).

The hydrogenated block copolymer (E-c) is a hydrogenated product of a block copolymer having a form of a block represented by the following Formula (a) or (b), and it is a hydrogenated block copolymer having a hydrogenation rate of usually 90 mole % or more, preferably 95 mole % or more.

X(YX)$_n$              (a)

(XY)$_n$              (b)

The examples of monovinyl-substituted aromatic hydrocarbon constituting a polymer block represented by X in Formula (a) or (b) described above include styrene or derivatives thereof such as styrene, α-methylstyrene, p-methylstyrene, chlorostyrene, lower alkyl-substituted styrene and vinylnaphthalene. They can be used alone or in combination of two or more kinds thereof. The examples of a conjugated diene constituting a polymer block represented by Y in Formula (a) or (b) include butadiene, isoprene, chloroprene. They can be used alone or in combination of two or more kinds thereof. The term n is an integer of usually 1 to 5, preferably 1 or 2. The specific examples of the hydrogenated block copolymer (E-c) include styrene block copolymers such as styrene/ethylene/butene/styrene block copolymers (SEBS), styrene/ethylene/propylene/styrene block copolymers (SEPS) and styrene/ethylene/propylene block copolymers (SEP). A block copolymer before hydrogenation can be produced, for example, by carrying out block copolymerization in an inert solvent under the presence of a lithium catalyst or a Ziegler catalyst. Detailed production processes therefor are described in, for example, Japanese Patent Publication No. 23798/1965 and the like. The hydrogenation treatment can be carried out in an inert solvent under the presence of a publicly known hydrogenation catalyst. Detailed processes thereof are described in, for example, Japanese Patent Publication No. 8704/1967, ditto 6636/1968, ditto 20814/1971 and the like. When butadiene is used as a conjugated diene monomer, a proportion of a 1,2-bond amount in the polybutadiene block is usually 20 to 80% by weight, preferably 30 to 60% by weight. Commercially available products can be used as the hydrogenated block copolymer (E-c). The specific products thereof include Clayton G1657 (registered trade name) (manufactured by Shell Chemicals Ltd.), Septon 2004 (registered trade name) (manufactured by Kuraray Co., Ltd.), Tuftec H1052 (registered trade name) (manufactured by Asahi Kasei Corporation) and the like.

The propylene/α-olefin copolymer rubber(E-d) is a random copolymer rubber of propylene with α-olefin having 4 to 20 carbon atoms. In the propylene/α-olefin copolymer (E-d), a mole ratio (structural unit derived from propylene/structural unit derived from α-olefin) of a structural unit derived from propylene to a structural unit derived from α-olefin is usually 95/5 to 5/95, preferably 80/15 to 20/80. Also, in the propylene/α-olefin copolymer rubber (E-d), two or more kinds of α-olefins may be used, and one of them may be ethylene. A melt flow rate (MFR; ASTM D1238, 230° C., load: 2.16 kg) of the propylene/α-olefin random copolymer rubber (E-d) falls in a range of usually 0.1 g/10 minutes or more, preferably 0.5 to 30 g/10 minutes.

The elastomer (E) can be used alone or in combination of two or more kinds thereof.

In the present invention, the elastomer (E) is used in an amount in the range of usually 0 to 20 parts by weight, preferably 1 to 10 parts by weight based on 100 parts by weight of the propylene/ethylene block copolymer (A).

<Polyethylene Resin (C)>

A polyethylene resin (C) may be added together with or in place of the elastomer (E) to the film for thermal sterilization packaging according to the present invention for the purpose of providing it with functions such as an impact resistance, a transparency and a flexibility.

For example, when the impact resistance is provided while inhibiting the transparency from being reduced, preferably added is linear low density polyethylene having a density of 0.900 to 0.930 kg/m$^3$ which is produced by copolymerizing ethylene with α-olefin of C4 or higher under the presence of a metallocene catalyst.

A content of the polyethylene resin (C) based on the film for thermal sterilization packaging according to the present invention is varied according to the characteristics to be provided, and it falls in a range of usually 0 to 20% by weight, preferably 1 to 10% by weight. The polyethylene resin (C) can be used alone or in combination of two or more kinds thereof.

Also, in a case of the film for thermal sterilization packaging comprising the propylene/ethylene block copolymer, the elastomer (E) and the polyethylene resin (C), an amount of the propylene/ethylene block copolymer is varied according to the characteristics to be provided, and it falls in a range of usually 80 to 99% by weight, preferably 90 to 99% by weight. A total amount of the elastomer (E) and the polyethylene resin (C) is usually 0 to 20 parts by weight, preferably 1 to 10 parts by weight based on 100 parts by weight of the propylene/ethylene block copolymer (A). A proportion of the elastomer to the polyethylene resin can optionally be controlled according to the purposes.

<Others>

A propylene resin (P) may be added, if necessary, to the film for thermal sterilization packaging according to the present invention. The propylene resin (P) used above includes homopolymers of propylene which are different from the propylene/ethylene block copolymer (A) or (B), propylene/ethylene copolymer, propylene/α-olefin copolymers, propylene/ethylene/α-olefin copolymer, propylene/ethylene block copolymers and propylene/α-olefin block copolymers. In this regard, α-olefins having 4 to 20 carbon atoms can be used as the α-olefin.

The film for thermal sterilization packaging according to the present invention may contain, within the range not impairing the purpose of the present invention, if necessary, additives such as vitamins, an antioxidant, a heat resistant stabilizer, a weather resistant stabilizer, a slipping agent and an antiblocking agent.

The respective components described above and, if necessary, various additives are blended by means of, for example, a mixer such as a Henschel mixer, a Banbury mixer and a tumbler mixer; then, the mixture is pelletized by means of a single screw or double screw extruding machine; and the resulting pellets are molded by various methods such as extrusion molding, injection molding and injection stretching molding, whereby various molded articles are obtained.

Examples of a production process of the film for thermal sterilization packaging according to the present invention include a multilayer inflation film molding method, a multilayer T die cast film molding method, a press molding method, an extrusion laminating method and a dry laminating method, and it is preferably the multilayer T die cast film molding method.

Also, the film for thermal sterilization packaging according to the present invention may be a composite film. The composite films include a film comprising a base material and laminated thereon the film for thermal sterilization packaging according to the present invention. The base materials include, for example, cellophane, paper, paper boards, fabrics, aluminum foils, polyamide resins such as nylon 6 and nylon 66, polyester resins such as polyethylene terephthalate and polybutylene terephthalate, stretched polypropylene. Methods for laminating the film for thermal sterilization packaging according to the present invention on the base material include, for example, a dry laminating method, a wet laminating method, a sand laminating method and a hot melt laminating method.

A laminated body prepared by using the film for thermal sterilization packaging according to the present invention is prepared by laminating (1) a layer containing a polyester resin, (2) at least one layer selected from the group consisting of a layer comprising aluminum, a layer containing a polyester resin on which inorganic fine particles are deposited and a layer containing a polyamide resin on which inorganic fine particles are deposited, (3) a layer containing a polyamide resin and (4) the film for thermal sterilization packaging according to the present invention in this order, and examples of the laminated body include:

a layer containing a polyester resin/a layer comprising aluminum/a layer containing a polyamide resin/the film for thermal sterilization packaging according to the present invention, a layer containing a polyester resin/a layer containing a polyester resin on which inorganic fine particles are deposited/a layer containing a polyamide resin/the film for thermal sterilization packaging according to the present invention, a layer containing a polyester resin/a layer containing a polyamide resin on which inorganic fine particles are deposited/a layer containing a polyamide resin/the film for thermal sterilization packaging according to the present invention, a layer containing a polyester resin/a layer comprising aluminum/a layer containing a polyamide resin on which inorganic fine particles are deposited/a layer containing a polyamide resin/the film for thermal sterilization packaging according to the present invention and a layer containing a polyester resin/a layer containing a polyester resin on which inorganic fine particles are deposited/a layer comprising aluminum/a layer containing a polyamide resin on which inorganic fine particles are deposited/a layer containing a polyamide resin/the film for thermal sterilization packaging according to the present invention.

The polyester resin shall not specifically be restricted as long as it is a polyester resin which is usually used, and polyethylene terephthalate (PET) is suitably used.

The polyamide resin shall not specifically be restricted as long as it is a polyamide resin which is usually used, and nylon 6, nylon 66 and the like are suitably used.

<Film for Thermal Sterilization Packaging>

The film for thermal sterilization packaging according to the present invention is characterized by comprising at least one outer layer containing the propylene/ethylene block copolymer (A) satisfying the requisites described above and at least one intermediate layer or an outer layer containing the propylene/ethylene block copolymer (B) which is not the same as the above propylene/ethylene block copolymer (A). The propylene/ethylene block copolymer (B) which is not the same as the above propylene/ethylene block copolymer (A) satisfies preferably the requisites described above.

In the present invention, "the outer layer" and "the intermediate layer" are a concept showing only a positional relation of an outer layer/an intermediate layer ----/an outer layer. In a case of, for example, a layer structure such as an A layer/a B layer/a C layer, the A layer and the C layer are outer layers, and the B layer is an intermediate layer. In a case of a two layer structure such as an A layer/a B layer, the A layer and the B layer are outer layers.

In the present invention, use of the propylene/ethylene block copolymer (A) described above for the film for thermal sterilization packaging makes it possible to obtain very well a transparency, an impact resistance, a heat sealing property, a heat resistance and a blocking resistance at a good balance.

The film for thermal sterilization packaging according to the present invention has an outer layer containing the propylene/ethylene block copolymer (A) described above, and therefore the excellent transparency and the excellent strength can be obtained. Particularly when the film for thermal sterilization packaging according to the present invention has a heat sealing layer containing the propylene/ethylene block copolymer (A), the excellent transparency and the excellent heat sealing strength can be obtained.

Further, if the film for thermal sterilization packaging according to the present invention has an intermediate layer or an outer layer containing the propylene/ethylene block copolymer (B) described above, more excellent impact resistance can be obtained.

One embodiment of the film for thermal sterilization packaging according to the present invention includes a film comprising an outer layer containing the propylene/ethylene block copolymer (A) and another outer layer containing the propylene/ethylene block copolymer (B). In this case, in the film for thermal sterilization packaging, a proportion of a thickness of the outer layer containing the propylene/ethylene block copolymer (A) is preferably 10 to 50%, and a proportion of a thickness of another outer layer containing the propylene/ethylene block copolymer (B) is preferably 50 to 90% based on a whole thickness of the film for thermal sterilization packaging (provided that the total of the proportions of the thicknesses of both layers is 100%).

Another embodiment of the film for thermal sterilization packaging according to the present invention includes a film comprising an outer layer containing the propylene/ethylene block copolymer (A), at least one intermediate layer containing the propylene/ethylene block copolymer (B) and another outer layer containing the propylene/ethylene block copolymer (A) or the propylene/ethylene block copolymer (B). In this case, in the film for thermal sterilization packaging, a proportion of a thickness of the outer layer containing the propylene/ethylene block copolymer (A) is preferably 10 to 30%; a proportion of a thickness (when two intermediate layers are present, a total thickness thereof) of the intermediate layer containing the propylene/ethylene block copolymer (B) is preferably 40 to 80%; and a proportion of a thickness of another outer layer containing the propylene/ethylene block copolymer (A) or the propylene/ethylene block copolymer (B) is preferably 10 to 30% based on a whole thickness of the film for thermal sterilization packaging (provided that the total of the proportions of the thicknesses of all layers is 100%).

In the film for thermal sterilization packaging according to the present invention, the outer layer containing the propylene/ethylene block copolymer (A) contains 80% by weight or more, preferably 90% by weight or more of the propylene/ethylene block copolymer (A), and the intermediate layer or the outer layer containing the propylene/ethylene block copolymer (B) contains 80% by weight or more, preferably 90% by weight or more of the propylene/ethylene block copolymer (B). The above layers may contain, if necessary, the elastomer (E), the polyethylene resin (C), the polypropylene resin (P) and the additives each described above.

When the film for thermal sterilization packaging according to the present invention comprises a multilayer constitution of an outer layer containing the propylene/ethylene block copolymer (A) and at least one intermediate layer containing the propylene/ethylene block copolymer (B), a package which is excellent in a total balance between a sealing strength, an impact resistance and a transparency can be obtained by using the film for thermal sterilization packaging according to the present invention. Examples of the film for thermal sterilization packaging having the above multilayer constitution include a film for thermal sterilization packaging having a three layer constitution in Which the propylene/ethylene block copolymer (A) is used for both outer layers and in which the propylene/ethylene block copolymer (B) is used for an intermediate layer. In the above case, the propylene/ethylene block copolymer (A) used for both outer layers may be the same or different in the respective layers as long as the requisites of the present invention are satisfied.

If the propylene/ethylene block copolymer (A) and/or the propylene/ethylene block copolymer (B) are obtained by polymerization under the presence of the metallocene catalyst in the film for thermal sterilization packaging according to the present invention, an interlayer adhesive strength in the film of a multilayer constitution is enhanced.

In the film of a multilayer constitution, the respective layers are put together in a dice part of a film molding equipment and turned into a multilayer film, and in this case, interfaces are formed between the respective layers even in resins having the same composition. The shearing speed becomes fast in the vicinity of the interface, and therefore a part (rubber) soluble in n-decane in the propylene/ethylene block copolymer is deformed and stretched to a large extent. Accordingly, a multilayer film prepared by using the propylene/ethylene block copolymer of a Ziegler catalyst system is reduced in an interlayer strength, and it tends to be reduced in a heat sealing property as compared with a single layer film prepared by using the same resin. If the propylene/ethylene block copolymer (A) and/or the propylene/ethylene block copolymer (B) are obtained by polymerization under the presence of the metallocene catalyst in the film for thermal sterilization packaging according to the present invention, a reduction in the heat sealing property due to a reduction in the interlayer strength can be prevented. Also in a multilayer film prepared by combining the propylene/ethylene block copolymer of a Ziegler catalyst system with the metallocene base propylene/ethylene block copolymer used in the present invention, a reduction in the heat sealing property due to a reduction in the interlayer strength is larger than in a multilayer film prepared by using only the Ziegler base propylene/ethylene block copolymer.

When a package is prepared by using the film for thermal sterilization packaging according to the present invention or a laminated body or a composite film prepared by using the film for thermal sterilization packaging according to the present invention, the film is preferably used so that an outer layer containing the propylene/ethylene block copolymer (A) is a heat sealing layer. In referring to the respective layers of the film of a multilayer constitution in the present invention, the outer layer containing the propylene/ethylene block copolymer (A) is referred to as "a heat sealing layer", and another outer layer containing the propylene/ethylene block copolymer (A) or the propylene/ethylene block copolymer (B) is referred to as "a lami layer".

A thickness of the film for thermal sterilization packaging according to the present invention is usually 20 to 200 µm, preferably 40 to 150 µm. When the film for thermal sterilization packaging according to the present invention is used in a multilayer constitution, the proportions of the thicknesses of the respective layers based on a whole thickness of the film for thermal sterilization packaging are set preferably to the ranges described above from the viewpoint of a heat sealing property, a heat resistance and an impact resistance of the film.

When the film for thermal sterilization packaging is prepared in a multilayer constitution, a content of the skeleton originating in ethylene in the part ($D_{sol}$) soluble in n-decane at room temperature in the propylene/ethylene block copolymer (B) used for the intermediate layer is preferably higher than a content of the skeleton originating in ethylene in the part ($D_{sol}$) soluble in n-decane at room temperature in the propylene/ethylene block copolymer (A) used for the outer layer. Assuming the above constitution allows the outer layer to be improved in a transparency, a heat resistance and a heat sealing property, allows the intermediate layer to be improved in an impact resistance and makes it possible to obtain the film for thermal sterilization packaging which is excellent in a balance between a transparency and an impact resistance and between a heat resistance and a heat sealing property.

An existing propylene block copolymer for thermal sterilization packaging may be used for the intermediate layer or the outer layer. Further, homogeneous polypropylene or random polypropylene prepared by polymerization under the presence of a metallocene catalyst may be used for the outer layer.

A transparency of the film for thermal sterilization packaging according to the present invention is 15% or less, preferably 10% or less in terms of a haze measured by using a test piece of the film for thermal sterilization packaging having a thickness of 70 µm according to ASTM D-1003. If the transparency exceeds 15%, the contents are less liable to be confirmed, and therefore it is not preferred.

The film for thermal sterilization packaging is required to provide the package with a heat sealing property and a heat resistance in thermal sterilization treatment, and therefore a melting point of the propylene/ethylene block copolymer (A) is 150 to 170° C., preferably 150 to 165° C. and more preferably 156 to 165° C. If the melting point is lower than 150° C., it is not preferred from the viewpoint of thermal sterilization treatment (heat resistance). An amount of the part ($D_{sol}$) soluble in n-decane at room temperature is 10 to 20% by weight. If the amount is less than 10% by weight, it is not preferred from the viewpoint of the impact resistance, and if the amount exceeds 20% by weight, it is not preferred from the viewpoint of the heat sealing strength.

A melting point of the propylene/ethylene block copolymer (B) is 140 to 170° C., preferably 145 to 170° C. and more preferably 146 to 165° C. If the melting point is lower than 140° C., it is not preferred from the viewpoint of thermal sterilization treatment (heat resistance). An amount of the part ($D_{sol}$) soluble in n-decane at room temperature is 10 to 30% by weight, preferably 20 to 30% by weight. If the above amount is less than 10% by weight, it is not preferred from the viewpoint of the impact resistance, and if the amount exceeds 30% by weight, it is not preferred from the viewpoint of the safety and health.

In the film for thermal sterilization packaging according to the present invention, a melt flow rate (MFR; ASTM D1238, 230° C., load: 2.16 kg) of the propylene/ethylene block copolymers (A) and (B) is 1 to 10 g/10 minutes, preferably 1.5 to 5 g/10 minutes. If the melt flow rate (MFR; ASTM D1238, 230° C., load: 2.16 kg) falls in the above range, it is preferred from the viewpoint of the moldability and the impact resistance.

The film for thermal sterilization packaging according to the present invention and laminated bodies or composite films prepared by using the film for thermal sterilization packaging according to the present invention are suitably used as films for packaging retort foods, particularly films for packaging retort curry and pasta sauce. Further, they can be used not only as films for packaging retort foods but also as films for packaging medical products, particularly films for packaging infusion solutions or films for packaging medicines.

EXAMPLES

Next, the present invention shall be explained in detail with reference to examples, but the present invention shall not be restricted by these examples. The following methods were used to measure the physical properties in the examples and the comparative examples.

(m1) Melt Flow Rate (MFR):

The melt flow rate (MFR) was measured according to ASTM D1238 (230° C., load: 2.16 kg).

(m2) Melting Point (Tm):

Measured by means of a differential scanning colorimeter (DSC, manufactured by PerkinElmer Co., Ltd.). An endothermic peak measured in the third step was defined as the melting point (Tm).

Measuring Conditions:

First step: heated up to 240° C. at 10° C./minute and held for minutes

Second step: cooled down to 60° C. at 10° C./minute

Third step: heated up to 240° C. at 10° C./minute (m3) Amount of the Part ($D_{sol}$) Soluble in n-Decane at Room Temperature:

n-Decane 200 ml was added to 5 g of a sample of the end product (that is, the propylene/ethylene block polymer of the present invention), and the mixture was heated at 145° C. for 30 minutes to dissolve the polymer. The solution was cooled down to 20° C. in about 3 hours and left standing for 30 minutes. Then, the deposit (hereinafter referred to as the n-decane-insoluble part: $D_{insol}$) was removed by filtering. The filtrate was put in an about three time amount of acetone to deposit a component dissolved in n-decane (deposit (A)). The deposit (A) was separated from acetone by filtering and dried. The filtrate was concentrated and dried up, but a residue was not observed.

An amount of the n-decane-soluble part was determined according to the following equation:

amount (wt %) of n-decane-soluble part=[weight of deposit (A)/weight of sample]×100

(m4) Mw/Mn Measurement [Weight Average Molecular Weight (Mw), Number Average Molecular Weight (Mn)]:

Measured in the following manner by means of GPC-150C Plus manufactured by Waters Co., Ltd. The separating columns were TSKgel GNH6-HT and TSKgel GMH6-HTL, and the column size was a minor diameter of 7.5 mm and a length of 600 mm in both columns. The column temperature was 140° C., and o-dichlorobenzene (Wako Pure Chemical Industries, Inc.) and BHT (Wako Pure Chemical Industries, Inc.) 0.025% by weight as an antioxidant for a moving phase were used, and the phase was moved at 1.0 ml/minute. A concentration of the sample was 0.1% by weight, and an injection amount of the sample was 500 microliter. A differential refractometer was used as a detector. Standard polystyrene manufactured by Tosoh Corp. was used for a molecular weight of MW<1000 and MW>4×10$^6$, and standard polystyrene manufactured by Pressure Chemical Co., Ltd. was used for a molecular weight of 1000≦Mw≦4×10$^6$.

(m5) Content of Skeleton Originating in Ethylene:

The sample 20 to 30 mg was dissolved in 0.6 ml of a (1,2,4-trichlorobenzene:deuterated benzene=2:1) solution, and then it was subjected to carbon nuclear magnetic resonance analysis ($^{13}$C-NMR) in order to measure concentration of a skeleton originating in ethylene in $D_{insol}$ or $D_{sol}$. Propylene, ethylene and α-olefin were quantitatively determined by dyad chain distribution. In a case of, for example, a propylene-ethylene copolymer, $$PP=S_{\alpha\alpha},\ EP=S_{\alpha\gamma}+S_{\alpha\beta},\ EE=\tfrac{1}{2}(S_{\beta\delta}+S_{\delta\delta})+\tfrac{1}{4}S_{\gamma\delta}$$

were used to determine it from the following calculating equations (Eq-1) and (Eq-2).

Propylene (mol %)=(PP+½EP)×100/[(PP+½EP)+ (½EP+EE)] (Eq-1)

Ethylene (mol %)=(½EP+EE)×100/[(PP+½EP)+ (½EP+EE)] (Eq-2)

(m6) Limiting Viscosity [η]:

Measured in a decalin solvent at 135° C. The sample about 20 mg was dissolved in 15 ml of decalin, and a specific viscosity $\eta_{sp}$ thereof was measured in an oil bath of 135° C. The decalin solvent 5 ml was added to the above decalin solution to dilute it, and then a specific viscosity $\eta_{sp}$ thereof was measured in the same manner. This dilution operation was further repeated twice, and a value of $\eta_{sp}/C$ obtained when extrapolating the concentration (C) into 0 was determined as the limiting viscosity.

[η]=lim($\eta_{sp}$/C)(C→0)

(m7) 2,1-Insertion Bond Amount and 1,3-Insertion Bond Amount:

A 2,1-insertion bond amount and a 1,3-insertion bond amount of propylene were measured by means of $^{13}$C-NMR according to Japanese Patent Application Laid-Open No. 145212/1995.

(m8) Heat Sealing Strength of the Film:

A heat sealing strength of the film was measured according to JIS K 6781. The tensile speed was 200 mm/minute, and a distance between the zippers was 80 mm.

A sample for heat sealing was prepared by cutting the film into a strip piece having a width of 15 mm.

The sample was sealed on the heat sealing conditions of a sealing time of 1 second, a pressure of 0.2 MPa·G (MPa·G means a gauge pressure; hereinafter the same shall apply) and a sealing width of 5 mm. Both ends of the film obtained by varying an upper part temperature of the sealing bar and subjecting a lower part to heat sealing at 70° C. were pulled at 200 mm/minute to measure a maximum strength, and a relation of the upper part temperature-the heat sealing strength was plotted to prepare a diagram. A maximum strength in the heat sealing strength was measured from the above plotted diagram to set it as a maximum heat sealing strength.

(m9) Impact Test of the Film:

A sample was prepared by cutting the film into a size of 5×5 cm, and a surface impact strength thereof was measured at prescribed temperature by means of an impact tester (a system in which a hammer is pushed upward from beneath (conditions of the hammer: tip 1 inch, 3.0 J)).

(m10) Haze of the Film:

Measured according to ASTM D-1003.

(m11) Blocking Resistance of the Film:

The chill roll surfaces of the films of a MD direction 10 cm×a TD direction 10 cm were superposed on each other and held under a load of 200 g/cm² for 3 days in a thermostatic bath of 50° C. Thereafter, they were subjected to conditioning in a room of 23° C. and a humidity of 50% for 24 hours or longer, and then a peel strength thereof observed in peeling them off at a tension speed of 200 mm/minute was measured to evaluate the blocking resistance, wherein a value obtained by dividing the peel strength with a width of the test piece was set to a blocking coefficient. In this regard, the smaller the blocking coefficient is, the more excellent the blocking resistance is.

(m12) Interlayer Strength of the Film:

Obtained was a film in which a lami layer side (an anti-cooling roll surface side in a case of a single layer film) was subjected to corona treatment (45 dyn) in producing the film. An O-PET film (12 μm) was dry-laminated (adhesive: Takelac A315, coating amount: 3 g/m²) on a lami layer side of the above film by means of a dry laminator. Then, the above film was left standing at 50° C. for 24 hours, and a heat sealing strength of the heat sealed surface was measured according to JIS K 6781 (a tension speed: 200 mm/minute, a distance between the zippers: 80 mm) to set a maximum heat sealing strength value to an interlayer strength.

A sample for heat sealing; a sample prepared by cutting the film into a strip piece having a width of 15 mm was used.

Heat sealing conditions; the sample was sealed on the conditions of a sealing time of 1 second, a pressure of 0.2 MPa·G (MPa·G means a gauge pressure; hereinafter the same shall apply) and a sealing width of 5 mm.

Both ends of the film obtained by varying an upper part temperature of the sealing bar and subjecting a lower part to heat sealing at 70° C. were pulled at 200 mm/minute to measure a maximum strength, and a relation of the upper part temperature-the heat sealing strength was plotted to prepare a diagram. A maximum strength in the heat sealing strength was measured from the above plotted diagram to set it as an interlayer strength.

Production Example 1

Production of a Propylene/Ethylene Block Copolymer (A1)

(1) Production of a Solid Catalyst Carrier:

A side arm flask of 1 liter was charged with 300 g of $SiO_2$, and 800 mL of toluene was added thereto to obtain a slurry. Then, the slurry was transferred into a four neck flask of 5 liter, and 260 mL of toluene was added thereto. A toluene solution (10 weight % solution) 2830 mL of methylaluminoxane (hereinafter referred to as MAO) was added thereto, and the solution was stirred at room temperature for 30 minutes. The solution was heated up to 110° C. in one hour to react them for 4 hours. After finishing the reaction, the solution was cooled down to room temperature. After cooled, the supernatant toluene liquid was removed, and toluene was added thereto again. The substitution was repeated until the substitution rate reached 95%.

(2) Production of a Solid Catalyst (Carrying of a Metal Catalyst Component on a Carrier):

A four neck flask of 5 liter was charged with 2.0 g of [3-(1',1',4',4',7',7',10',10'-octamethyloctahydrodibenzo[b,h]-fluorenyl)(1,1,3-trimethyl-5-tert-butyl-1,2,3,3a-tetrahydropentalene)]zirconium dichloride in a glove box. The flask was taken out from the glove box, and 0.46 liter of toluene and 1.4 liter of the MAO/$SiO_2$/toluene slurry prepared in (1) described above were added thereto under nitrogen atmosphere and stirred for 30 minutes to carry it thereon. The resulting [3-(1',1',4',4',7',7',10',10'-octamethyloctahydrodibenzo[b,h]fluorenyl)(1,1,3-trimethyl-5-tert-butyl-1,2,3,3a-tetrahydropentalene)]zirconium dichloride/MAO/$SiO_2$/toluene slurry was substituted by 99% with n-heptane, and the final slurry amount was set to 4.5 liter. The above operation was carried out at room temperature.

(3) Production of a Pre-Polymerization Catalyst:

An autoclave having a content volume of 200 liter equipped with a stirrer was charged with 404 g of the solid catalyst component prepared in (2) described above, 218 ml of triethylaluminum and 100 liter of heptane and charged with 1212 g of ethylene at an inside temperature held at 15 to 20° C. to react them for 180 minutes while stirring. After finishing the polymerization, the solid component was settled down, and the supernatant liquid was removed. The solid component was washed twice with heptane, and the pre-polymerization catalyst thus obtained was suspended again in refined heptane and controlled by heptane so that a concentration of the solid catalyst component was 4 g/L. The above pre-polymerization catalyst contained 3 g of polyethylene per 1 g of the solid catalyst component.

(4) Main Polymerization:

A tubular polymerization equipment having a content volume of 58 liter was continuously fed with 30 kg/hour of propylene, 1 NL/hour of hydrogen, 6.2 g/hour of the catalyst slurry produced in (3) described above in terms of the solid catalyst component and 2.3 ml/hour of triethylaluminum, and they were reacted in a state of a full liquid in which a vacant space was not present. A temperature of the tubular polymerization equipment was 30° C., and a pressure thereof was 3.1 MPa/G.

The slurry obtained above was sent to a Bessel polymerization equipment having a content volume of 100 L equipped with a stirrer for further carry out the polymerization. The polymerization equipment was continuously fed with 15 kg/hour of propylene and hydrogen so that a hydrogen concentration in a gas phase part was 0.09 mol % The polymerization was carried out at a polymerization temperature of 70° C. and a pressure of 3.0 MPa/g.

The slurry obtained above was transferred to a wedge tube having a content volume of 2.4 liter, gasified and subjected to gas-solid separation, and then the propylene homopolymer powder was sent to a gas phase polymerization equipment of 480 liter to carry out ethylene/propylene block copolymerization. Propylene, ethylene and hydrogen were continuously fed so that a gas composition in the gas phase polymerization equipment was ethylene/(ethylene+propylene)=0.10 (mole ratio) and hydrogen/ethylene≈0 (mole ratio). The polymerization was carried out at a polymerization temperature of 70° C. and a pressure of 1.1 MPa/G. After the polymerization, the product was dried under vacuum at 80° C. to obtain a propylene/ethylene block copolymer (A1). The physical properties of the propylene/ethylene block copolymer (A1) obtained above are shown in Table 1.

Production Example 2

Production of a Propylene/Ethylene Block Copolymer (A2)

A propylene block copolymer was produced by the same process as in Production Example 1, except that the polymerization process was changed as follows.
(1) Main Polymerization:

A tubular polymerization equipment having a content volume of 58 liter was continuously fed with 30 kg/hour of propylene, 1 NL/hour of hydrogen, 6.2 g/hour of the catalyst slurry produced in (3) of Production Example 1 in terms of the solid catalyst component and 2.3 ml/hour of triethylaluminum, and they were reacted in a state of a full liquid in which a vacant space was not present. A temperature of the tubular polymerization equipment was 30° C., and a pressure thereof was 3.1 MPa/G.

The slurry obtained above was sent to the Bessel polymerization equipment having a content volume of 100 liter equipped with a stirrer to further carry out the polymerization. The polymerization equipment was continuously fed with 15 kg/hour of propylene and hydrogen so that a hydrogen concentration in a gas phase part was 0.09 mol The polymerization was carried out at a polymerization temperature of 70° C. and a pressure of 3.0 MPa/G.

The slurry obtained above was transferred to a wedge tube having a content volume of 2.4 liter, gasified and subjected to gas-solid separation, and then the propylene homopolymer powder was sent to a gas phase polymerization equipment of 480 liter to carry out ethylene/propylene block copolymerization. Propylene, ethylene and hydrogen were continuously fed so that a gas composition in the gas phase polymerization equipment was ethylene/(ethylene+propylene)=0.10 (mole ratio) and hydrogen/ethylene≈0 (mole ratio). The polymerization was carried out at a polymerization temperature of 70° C. and a pressure of 0.9 MPa/G. After the polymerization, the product was dried under vacuum at 80° C. to obtain a propylene/ethylene block copolymer (A2). The physical properties of the propylene/ethylene block copolymer (A2) obtained above are shown in Table 1.

Production Example 3

Production of a Propylene Block Copolymer (B1)

A propylene block copolymer was produced by the same process as in Production Example 1, except that the polymerization process was changed as follows.

(1) Main Polymerization:

A tubular polymerization equipment having a content volume of 58 liter was continuously fed with 30 kg/hour of propylene, 1 NL/hour of hydrogen, 6.2 g/hour of the catalyst slurry produced in (3) of Production Example 1 in terms of the solid catalyst component and 2.3 ml/hour of triethylaluminum, and they were reacted in a state of a full liquid in which a vacant space was not present. A temperature of the tubular polymerization equipment was 30° C., and a pressure thereof was 3.1 MPa/G.

The slurry obtained above was sent to the Bessel polymerization equipment having a content volume of 100 liter equipped with a stirrer to further carry out the polymerization. The polymerization equipment was continuously fed with 15 kg/hour of propylene and hydrogen so that a hydrogen concentration in a gas phase part was 0.09 mol % The polymerization was carried out at a polymerization temperature of 70° C. and a pressure of 3.0 MPa/G.

The slurry obtained above was transferred to a wedge tube having a content volume of 2.4 liter, gasified and subjected to gas-solid separation, and then the propylene homopolymer powder was sent to a gas phase polymerization equipment of 480 liter to carry out ethylene/propylene block copolymerization. Propylene, ethylene and hydrogen were continuously fed so that a gas composition in the gas phase polymerization equipment was ethylene/(ethylene+propylene)=0.20 (mole ratio) and hydrogen/ethylene≈0 (mole ratio). The polymerization was carried out at a polymerization temperature of 70° C. and a pressure of 1.0 MPa/G. After the polymerization, the product was dried under vacuum at 80° C. to obtain a propylene block copolymer (B1). The physical properties of the propylene block copolymer (B1) obtained above are shown in Table 1.

Production Example 4

Production of a Propylene Block Copolymer (B2)

(1) Production of a Solid Catalyst Carrier:

A side arm flask of 1 liter was charged with 300 g of $SiO_2$, and 800 mL of toluene was added thereto to obtain a slurry. Then, the slurry was transferred into a four neck flask of 5 liter, and 260 mL of toluene was added thereto. A toluene solution (10 weight solution) 2830 mL of methylaluminoxane (hereinafter referred to as MAO) was added thereto, and the solution was stirred at room temperature for 30 minutes. The solution was heated up to 110° C. in one hour to react them for 4 hours. After finishing the reaction, the solution was cooled down to room temperature. After cooled, the supernatant toluene liquid was removed, and toluene was added thereto again. The substitution was repeated until the substitution rate reached 95%.
(2) Production of a Solid Catalyst (Carrying of a Metal Catalyst Component on a Carrier):

A four neck flask of 5 liter was charged with 2.0 g of diphenylmethylene(3-t-butyl-5-methylcyclopentadienyl)(2,7-t-butylfluorenyl)zirconium dichloride in a glove box. The flask was taken out from the glove box, and 0.46 liter of toluene and 1.4 liter of the $MAO/SiO_2$/toluene slurry prepared in (1) described above were added thereto under nitrogen atmosphere and stirred for 30 minutes to carry it thereon. The resulting diphenylmethylene(3-t-butyl-5-methylcyclopentadienyl)(2,7-t-butylfluorenyl)zirconium dichloride/ $MAO/SiO_2$/toluene slurry was substituted by 99% with n-heptane, and the final slurry amount was set to 4.5 liter. The above operation was carried out at room temperature.

(3) Production of a Pre-Polymerization Catalyst:

An autoclave having a content volume of 200 liter equipped with a stirrer was charged with 404 g of the solid catalyst component prepared in (2) described above, 218 ml of triethylaluminum and 100 liter of heptane and charged with 606 g of ethylene at an inside temperature held at 15 to 20° C., and then they were reacted for 180 minutes while stirring. After finishing the polymerization, the solid component was settled down, and the supernatant liquid was removed. The solid component was washed twice with heptane, and the pre-polymerization catalyst thus obtained was suspended again in refined heptane and controlled by heptane so that a concentration of the solid catalyst component was 6 g/L. The above pre-polymerization catalyst contained 3 g of polyethylene per 1 g of the solid catalyst component.

(4) Main Polymerization:

A circulation type tubular polymerization equipment having a content volume of 58 liter equipped with a jacket was continuously fed with 30 kg/hour of propylene, 2 NL/hour of hydrogen, 10.9 g/hour of the catalyst slurry produced in (3) described above in terms of the solid catalyst component and 2.5 ml/hour of triethylaluminum, and they were reacted in a state of a full liquid in which a vacant space was not present. A temperature of the tubular polymerization equipment was 30° C., and a pressure thereof was 3.1 MPa/G.

The slurry obtained above was sent to the Bessel polymerization equipment having a content volume of 100 L equipped with a stirrer to further carry out the polymerization. The polymerization equipment was fed with 15 kg/hour of propylene and hydrogen so that a hydrogen concentration in a gas phase part was 0.02 mol % The polymerization was carried out at a polymerization temperature of 70° C. and a pressure of 3.0 MPa/G.

The slurry obtained above was transferred to a liquid transfer tube having a content volume of 2.4 liter, gasified and subjected to gas-solid separation, and then the propylene homopolymer powder was sent to a gas phase polymerization equipment having a content volume of 480 liter to carry out ethylene/propylene block copolymerization. Propylene, ethylene and hydrogen were continuously fed so that a gas composition in the gas phase polymerization equipment was ethylene/(ethylene+propylene)=0.19 (mole ratio) and hydrogen/ethylene≈0 (mole ratio). The polymerization was carried out at a polymerization temperature of 70° C. and a pressure of 1.1 MPa/G. After the polymerization, the product was dried under vacuum at 80° C. to obtain a propylene block copolymer (B2). The physical properties of the propylene block copolymer (B2) obtained above are shown in Table 1.

TABLE 1

| | Items | Production Example 1 | 2 | 3 | 4 |
|---|---|---|---|---|---|
| | Kind of polymers | A1 | A2 | B1 | B2 |
| $D_{insol}$ | MFR (g/10 minutes) | 1.5 | 1.5 | 1.5 | 1.5 |
| | 1,3-Bond amount + 2,1-bond amount (mol %) | 0 | 0 | 0 | 0.1 |
| | Amount (wt %) | 80 | 84 | 80 | 75 |
| | Content of skeleton originating in ethylene (mol %) | 0.2 | 0.1 | 0.2 | 0.4 |
| | Mw/Mn | 2.2 | 2.2 | 2.2 | 2.2 |
| $D_{sol}$ | Amount (wt %) | 20 | 16 | 20 | 25 |
| | Content of skeleton originating in ethylene (mol %) | 20 | 20 | 30 | 29 |
| | [η] (dl/g) | 2.0 | 2.1 | 2.2 | 2.1 |
| | Mw/Mn | 2.1 | 2.2 | 2.2 | 2.2 |

TABLE 1-continued

| | Items | Production Example 1 | 2 | 3 | 4 |
|---|---|---|---|---|---|
| Whole | MFR (g/10 minutes) | 2.0 | 1.9 | 1.9 | 1.7 |
| | Melting point (° C.) | 156 | 156 | 156 | 145 |

Production Example 5

Production of a Propylene/Ethylene Block Copolymer (A3)

(1) Production of a Solid Catalyst Carrier:

A side arm flask having a volume of 1 liter was charged with 300 g of $SiO_2$, and 800 mL of toluene was added thereto to obtain a slurry.

Next, the slurry was transferred into a four neck flask having a volume of 5 liter, and 260 mL of toluene was added thereto.

A methylaluminoxane (hereinafter referred to as MAO)-toluene solution (10 weight % solution, manufactured by Albemarle Corporation) 2830 mL was added thereto, and the solution was stirred at room temperature for 30 minutes. The solution was heated up to 110° C. in one hour to react them for hours. After finishing the reaction, the solution was cooled down to room temperature. After cooled, the supernatant toluene liquid was removed, and the substitution was repeated with fresh toluene until the substitution rate reached 95%.

(2) Production of a Solid Catalyst Component (Carrying of a Metal Catalyst Component on a Carrier):

A four neck flask having a volume of 5 liter was charged with 2.0 g of [3-(1',1',4',4',7',7',10',10'-octamethyloctahydrodibenzo[b,h]fluorenyl)(1,1,3-trimethyl-5-tert-butyl-1,2,3,3a-tetrahydropentalene)]zirconium dichloride synthesized according to descriptions of WO 2006/0683085 in a glove box. The flask was taken out from the glove box, and 0.46 liter of toluene and 1.4 liter of the MAO/$SiO_2$/toluene slurry prepared in (1) described above were added thereto under nitrogen atmosphere and stirred for 30 minutes to carry it thereon.

The resulting [3-(1',1',4',4',7',7',10',10'-octamethyloctahydrodibenzo[b,h]fluorenyl)(1,1,3-trimethyl-5-tert-butyl-1,2,3,3a-tetrahydropentalene)]zirconium dichloride/MAO/$SiO_2$/toluene slurry was substituted by 99% with n-heptane, and the final slurry amount was set to 4.5 liter. The above operation was carried out at room temperature.

(3) Production of a Pre-Polymerization Catalyst:

An autoclave having a content volume of 200 liter equipped with a stirrer was charged with 202 g of the solid catalyst component prepared in (2) described above, 109 ml of triethylaluminum and 100 liter of heptane and charged with 2020 g of ethylene at an inside temperature held at 15 to 20° C. to react them for 180 minutes while stirring.

After finishing the polymerization, the solid component was settled down, and removing of the supernatant liquid and washing of the solid component with heptane were carried out twice. The pre-polymerization catalyst thus obtained was suspended again in refined heptane and controlled by heptane so that a concentration of the solid catalyst component was 2 g/liter. The above pre-polymerization catalyst contained 10 g of polyethylene per 1 g of the solid catalyst component.

(4) Main Polymerization:

A tubular polymerization equipment having a content volume of 58 liter was continuously fed with 40 kg/hour of propylene, 5 NL/hour of hydrogen, 1.6 g/hour of the catalyst slurry produced in (3) described above in terms of the solid catalyst component and 1.0 g/hour of triethylaluminum, and they were reacted in a state of a full liquid in which a vacant space was not present in the tubular polymerization equipment. A temperature of the tubular polymerization equipment was 30° C., and a pressure thereof was 3.2 MPa/G.

The slurry obtained above was sent to a Bessel polymerization equipment having a content volume of 1000 liter equipped with a stirrer to further carry out the polymerization. The polymerization equipment was fed with 45 kg/hour of propylene, ethylene so that an ethylene concentration in a gas phase part was 0.35 mol % and hydrogen so that a hydrogen concentration in the gas phase part was 0.12 mol % The polymerization was carried out at a polymerization temperature of 72° C. and a pressure of 3.1 MPa/G.

The slurry obtained above was sent to a Bessel polymerization equipment having a content volume of 500 liter equipped with a stirrer to further carry out the polymerization. The polymerization equipment was fed with 10. kg/hour of propylene, ethylene so that an ethylene concentration in the gas phase part was 0.35 mol % and hydrogen so that a hydrogen concentration in a gas phase part was 0.12 mol % The polymerization was carried out at a polymerization temperature of 71° C. and a pressure of 3.0 MPa/G.

The slurry obtained above was sent to the Bessel polymerization equipment having a content volume of 500 liter equipped with a stirrer to further carry out the polymerization. The polymerization equipment was fed with 10 kg/hour of propylene, ethylene so that an ethylene concentration in a gas phase part was 0.35 mol % and hydrogen so that a hydrogen concentration in the gas phase part was 0.12 mol % The polymerization was carried out at a polymerization temperature of 70° C. and a pressure of 3.0 MPa/G.

The slurry obtained above was sent to the Bessel polymerization equipment having a content volume of 500 liter equipped with a stirrer to carry out copolymerization. The polymerization equipment was fed with 10 kg/hour of propylene and hydrogen so that a hydrogen concentration in a gas phase part was 0.11 mol %. The polymerization was carried out while supplying ethylene so that a polymerization temperature of 62° C. and a pressure of 2.9 MPa/G were maintained.

The slurry obtained was vaporized and then subjected to gas-solid separation to obtain a propylene/ethylene block copolymer (A3). The propylene/ethylene block copolymer (A3) obtained above was dried under vacuum at 80° C. The characteristics of the propylene/ethylene block copolymer (A3) obtained are shown in Table 2.

Production Example 6

A Propylene/Ethylene Block Copolymer (A4)

A propylene/ethylene block copolymer was produced by the same process as in Production Example 1, except that the polymerization process was changed as follows.
(1) Main Polymerization:
A tubular polymerization equipment having a content volume of 58 liter was continuously fed with 40 kg/hour of propylene, 5 NL/hour of hydrogen, 1.6 g/hour of the catalyst slurry produced in (3) of Production Example 5 in terms of the solid catalyst component and 1.0 g/hour of triethylaluminum, and they were reacted in a state of a full liquid in which a vacant space was not present in the tubular polymerization equipment. A temperature of the tubular polymerization equipment was 30° C., and a pressure thereof was 3.2 MPa/G.

The slurry obtained above was sent to the Bessel polymerization equipment having a content volume of 1000 liter equipped with a stirrer to further carry out the polymerization. The polymerization equipment was fed with 45 kg/hour of propylene, ethylene so that an ethylene concentration in a gas phase part was 0.5 mol % and hydrogen so that a hydrogen concentration in the gas phase part was 0.13 mol % The polymerization was carried out at a polymerization temperature of 72° C. and a pressure of 3.1 MPa/G.

The slurry obtained above was sent to the Bessel polymerization equipment having a content volume of 500 liter equipped with a stirrer to further carry out the polymerization. The polymerization equipment was fed with 10 kg/hour of propylene, ethylene so that an ethylene concentration in a gas phase part was 0.5 mol % and hydrogen so that a hydrogen concentration in the gas phase part was 0.13 mol % The polymerization was carried out at a polymerization temperature of 71° C. and a pressure of 3.0 MPa/G.

The slurry obtained above was sent to the Bessel polymerization equipment having a content volume of 500 liter equipped with a stirrer to further carry out the polymerization. The polymerization equipment was fed with 10 kg/hour of propylene, ethylene so that an ethylene concentration in a gas phase part was 0.5 mol % and hydrogen so that a hydrogen concentration in the gas phase part was 0.13 mol % The polymerization was carried out at a polymerization temperature of 70° C. and a pressure of 3.0 MPa/G.

The slurry obtained above was sent to the Bessel polymerization equipment having a content volume of 500 liter equipped with a stirrer to carry out copolymerization. The polymerization equipment was fed with 10 kg/hour of propylene and hydrogen so that a hydrogen concentration in a gas phase part was 0.11 mol % The polymerization was carried out while supplying ethylene so that a polymerization temperature of 60° C. and a pressure of 2.9 MPa/G were maintained.

The slurry obtained above was vaporized and then subjected to gas-solid separation to obtain a propylene/ethylene block copolymer (A4). The propylene/ethylene block copolymer (A4) obtained was dried under vacuum at 80° C. The characteristics of the propylene/ethylene block copolymer (A4) obtained are shown in Table 2.

Production Example 7

Production of a Propylene Block Copolymer (B3)

A propylene block copolymer was produced by the same process as in Production Example 1, except that the polymerization process was changed as follows.
(1) Main Polymerization:
A tubular polymerization equipment having a content volume of 58 liter was continuously fed with 40 kg/hour of propylene, 5 NL/hour of hydrogen, 1.6 g/hour of the catalyst slurry produced in (3) of Production Example 5 in terms of the solid catalyst component and 1.0 g/hour of triethylaluminum, and they were reacted in a state of a full liquid in which a vacant space was not present in the tubular polymerization equipment. A temperature of the tubular polymerization equipment was 30° C., and a pressure thereof was 3.2 MPa/G.

The slurry obtained above was sent to the Bessel polymerization equipment having a content volume of 1000 liter equipped with a stirrer to further carry out the polymerization. The polymerization equipment was fed with 45 kg/hour of propylene, ethylene so that an ethylene concentration in a gas phase part was 0.5 mol % and hydrogen so that a hydrogen concentration in the gas phase part was 0.18 mol % The polymerization was carried out at a polymerization temperature of 72° C. and a pressure of 3.1 MPa/G.

The slurry obtained above was sent to the Bessel polymerization equipment having a content volume of 500 liter equipped with a stirrer to further carry out the polymerization. The polymerization equipment was fed with 10 kg/hour of propylene, ethylene so that an ethylene concentration in a gas phase part was 0.5 mol % and hydrogen so that a hydrogen concentration in the gas phase part was 0.18 mol % The polymerization was carried out at a polymerization temperature of 71° C. and a pressure of 3.0 MPa/G.

The slurry obtained above was sent to the Bessel polymerization equipment having a content volume of 500 liter equipped with a stirrer to further carry out the polymerization. The polymerization equipment was fed with 10 kg/hour of propylene, ethylene so that an ethylene concentration in a gas phase part was 0.5 mol % and hydrogen so that a hydrogen concentration in the gas phase part was 0.18 mol %. The polymerization was carried out at a polymerization temperature of 70° C. and a pressure of 3.0 MPa/G.

The slurry obtained above was sent to the Bessel polymerization equipment having a content volume of 500 liter equipped with a stirrer to carry out copolymerization. The polymerization equipment was fed with 10 kg/hour of propylene and hydrogen so that a hydrogen concentration in a gas phase part was 0.09 mol % The polymerization was carried out while supplying ethylene so that a polymerization temperature of 51° C. and a pressure of 2.9 MPa/G were maintained.

The slurry obtained was vaporized and then subjected to gas-solid separation to obtain a propylene block copolymer (B3). The propylene block copolymer (B3) obtained was dried under vacuum at 80° C. The characteristics of the propylene block copolymer (B3) obtained are shown in Table 2.

TABLE 2

| | | Production Example | | |
|---|---|---|---|---|
| | Items | 5 | 6 | 7 |
| | Kind of polymers | A3 | A4 | B3 |
| $D_{insol}$ | MFR (g/10 minutes) | 2.5 | 2.7 | 2.8 |
| | 1,3-Bond amount + 2,1-bond amount (mol %) | 0 | 0 | 0 |
| | Amount (wt %) | 84 | 81 | 78 |
| | Content of skeleton originating in ethylene (mol %) | 0.7 | 1.5 | 1.6 |
| | Mw/Mn | 2.3 | 2.3 | 2.3 |
| $D_{sol}$ | Amount (wt %) | 16 | 19 | 22 |
| | Content of skeleton originating in ethylene (mol %) | 20 | 21 | 35 |
| | [η] (dl/g) | 2.0 | 2.1 | 2.6 |
| | Mw/Mn | 2.3 | 2.3 | 2.3 |
| Whole | MFR (g/10 minutes) | 3.0 | 3.3 | 2.9 |
| | Melting point (° C.) | 154 | 151 | 150 |

Example 1

The propylene/ethylene block copolymer (A2) 100 parts by weight produced in Production Example 2 was mixed with 0.1 part by weight of a heat stabilizer IRGANOX 1010 (registered trade name of Ciba Geigy Inc.), 0.1 part by weight of a heat stabilizer IRGAFOS 168 (registered trade name of Ciba Geigy Inc.) and 0.1 part by weight of calcium stearate by means of a tumbler. Then, the mixture was molten and kneaded at 230° C. by means of a double screw extruding equipment (a same direction double screw kneading equipment) manufactured by Nakatani Machinery Co., Ltd. to prepare a pelletized polypropylene resin composition. This resin composition prepared was to be used for a heat sealing layer and a lami layer.

The propylene block copolymer (B1) 100 parts by weight produced in Production Example 3 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 230° C. by means of the double screw extruding equipment (a same direction double screw kneading equipment) manufactured by Nakatani Machinery Co., Ltd. to prepare a pelletized polypropylene resin composition. This resin composition prepared was to be used for an intermediate layer.

The above pelletized polypropylene resin compositions were extruded by means of a three kind, three layers cast extruding equipment (65 mmφ×3) equipped with a T die (die width: 800 mm, lip gap: 1.7 mm) of a feed block type manufactured by SHI Modern Machinery, Ltd. The extruding conditions were set to a die set temperature of 250° C., a chill roll temperature of 30° C. and a processing speed of 50 m/minute. As described above, the resin composition containing the propylene/ethylene block copolymer (A2) was used for the heat sealing layer and the lami layer, and the resin composition containing the propylene block copolymer (B1) was used for the intermediate layer, whereby a three layer film was produced. A proportion of the thicknesses of the heat sealing layer, the intermediate layer and the lami layer was set in order to 20%, 60% and 20% A whole thickness of the three layer film was 70 μm. A haze, an impact strength, a maximum sealing strength, a blocking resistance and an interlayer strength of the film obtained were measured, and the measurement results thereof are shown in Table 3.

Example 2

A three layer film was produced in the same manner as in Example 1, except that the propylene/ethylene block copolymer (A2) was changed to the propylene/ethylene block copolymer (A1) produced in Production Example 1 and that a proportion of the thicknesses of the heat sealing layer, the intermediate layer and the lami layer was changed in order to 15%, 70% and 15%. A haze, an impact strength, a maximum sealing strength, a blocking resistance and an interlayer strength of the film obtained were measured, and the measurement results thereof are shown in Table 3.

Example 3

A three layer film was produced in the same manner as in Example 1, except that the propylene block copolymer (B1) was changed to the propylene block copolymer (B2) produced in Production Example 4. A haze, an impact strength, a maximum sealing strength, a blocking resistance and an interlayer strength of the film obtained were measured, and the measurement results thereof are shown in Table 3.

Example 4

The propylene/ethylene block copolymer (A2) 100 parts by weight produced in Production Example 2 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 230° C. by means of the double screw extruding equipment (a same direction double screw kneading equipment) manufactured by Nakatani Machinery Co., Ltd. to prepare a pelletized polypropylene resin composition. This resin composition prepared was to be used for a heat sealing layer.

The propylene block copolymer (B2) 100 parts by weight produced in Production Example 4 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 230° C. by means of the double screw extruding equipment (a same direction double screw kneading equipment) manufactured by Nakatani Machinery Co., Ltd. to prepare a pelletized polypropylene resin composition. This resin composition prepared was to be used for an intermediate layer.

The propylene/ethylene block copolymer (A1) 100 parts by weight produced in Production Example 1 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 230° C. by means of the double screw extruding equipment (a same direction double screw kneading equipment) manufactured by Nakatani Machinery Co., Ltd. to prepare a pelletized polypropylene resin composition. This resin composition prepared was to be used for a lami layer.

The above pelletized polypropylene resin compositions were extruded by means of the three kind, three layers cast extruding equipment (65 mmϕ×3) equipped with a T die (die width: 800 mm, lip gap: 1.7 mm) of a feed block type manufactured by SHI Modern Machinery, Ltd. The extruding conditions were set to a die set temperature of 250° C., a chill roll temperature of 30° C. and a processing speed of 50 m/minute. As described above, the resin composition containing the propylene/ethylene block copolymer (A2) was used for the heat sealing layer; the resin composition containing the propylene block copolymer (B2) was used for the intermediate layer; and the resin composition containing the propylene/ethylene block copolymer (A1) was used for the lami layer, whereby a three layer film was produced. A proportion of the thicknesses of the heat sealing layer, the intermediate layer and the lami layer was set in order to 30%, 50% and 20%. A whole thickness of the three layer film was 70 µm. A haze, an impact strength, a maximum sealing strength, a blocking resistance and an interlayer strength of the film obtained were measured, and the measurement results thereof are shown in Table 3.

Comparative Example 1

The propylene/ethylene block copolymer (A2) 100 parts by weight produced in Production Example 2 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 230° C. by means of a double screw extruding equipment (a same direction double screw kneading equipment) manufactured by Nakatani Machinery Co., Ltd. to prepare a pelletized polypropylene resin composition. This resin composition prepared was to be used for a heat sealing layer, an intermediate layer and a lami layer.

The above pelletized polypropylene resin composition was extruded by means of the three kind, three layers cast extruding equipment (65 mmϕ×3) equipped with a T die (die width: 800 mm, lip gap: 1.7 mm) of a feed block type manufactured by SHI Modern Machinery, Ltd. The extruding conditions were set to a die set temperature of 250° C., a chill roll temperature of 30° C. and a processing speed of 50 m/minute. As described above, the resin composition containing the propylene/ethylene block copolymer (A2) was used for the heat sealing layer, the intermediate layer and the lami layer, whereby a three layer film was produced. A proportion of the thicknesses of the heat sealing layer, the intermediate layer and the lami layer was set in order to 20%, 60% and 20%. A whole thickness of the three layer film was 70 µm. A haze, an impact strength, a maximum sealing strength, a blocking resistance and an interlayer strength of the film obtained were measured, and the measurement results thereof are shown in Table 4.

Comparative Example 2

A three layer film was produced in the same manner as in Comparative Example 1, except that the propylene/ethylene block copolymer (A2) was changed to the propylene block copolymer (B2) produced in Production Example 4. A haze, an impact strength, a maximum sealing strength, a blocking resistance and an interlayer strength of the film obtained were measured, and the measurement results thereof are shown in Table 4.

Comparative Example 3

A three layer film was produced in the same manner as in Comparative Example 1, except that the propylene/ethylene block copolymer (A2) was changed to a commercially available retort brand (F-274NP (melting point: 161° C., MFR: 3 g/10 minutes), manufactured by Prime Polymer Co., Ltd.). A haze, an impact strength, a maximum sealing strength; a blocking resistance and an interlayer strength of the film obtained were measured, and the measurement results thereof are shown in Table 4.

Comparative Example 4

The propylene/ethylene block copolymer (A2) 100 parts by weight produced in Production Example 2 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 230° C. by means of the double screw extruding equipment (a same direction double screw kneading equipment) manufactured by Nakatani Machinery Co., Ltd. to prepare a pelletized polypropylene resin composition.

The above pelletized polypropylene resin composition was extruded by means of a single layer cast extruding equipment (65 mmϕ, a single layer molding equipment in which a feed block was detached) equipped with a T die (die width: 800 mm, lip gap: 1.7 mm) manufactured by SHI Modern Machinery, Ltd. The extruding conditions were set to a die set temperature of 250° C., a chill roll temperature of 30° C. and a processing speed of 20 m/minute, and a thickness of the film was 70 µm. A haze, an impact strength, a maximum sealing strength, a blocking resistance and an interlayer strength of the single layer film obtained were measured, and the measurement results thereof are shown in Table 5.

Comparative Example 5

A single layer film was produced in the same manner as in Comparative Example 4, except that the propylene/ethylene block copolymer (A2) was changed to the propylene block copolymer (B2) produced in Production Example 4. A haze, an impact strength, a maximum sealing strength, a blocking resistance and an interlayer strength of the film obtained were measured, and the measurement results thereof are shown in Table 5.

Comparative Example 6

A single layer film was produced in the same manner as in Comparative Example 4, except that the propylene/ethylene block copolymer (A2) was changed to the commercially available retort brand (F-274NP (melting point: 161° C., MFR: 3 g/10 minutes), manufactured by Prime Polymer Co., Ltd.). A haze, an impact strength, a maximum sealing strength, a blocking resistance and an interlayer strength of the film obtained were measured, and the measurement results thereof are shown in Table 5.

Comparative Example 7

The propylene/ethylene block copolymer (A3) 100 parts by weight produced in Production Example 5 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 190° C. by means of the double screw extruding equipment (a same direction double screw kneading equipment) manufactured by Nakatani Machinery Co., Ltd. to prepare a pelletized polypropylene resin composition. This resin composition was a resin to be used for a heat sealing layer, an intermediate layer and a lami layer. The above resin composition was extruded by means of the three kind, three layers cast extruding equipment (65 mmϕ×3) equipped with a T die (die width: 800 mm, lip gap: 1.7 mm) of a feed block type manufactured by SHI Modern Machinery, Ltd., and it was used for the heat sealing layer, the intermediate layer and the lami layer on the conditions of a die set temperature of 230° C., a chill roll temperature of 30° C. and a processing speed of 50 m/minute to produce a three layer film having a thickness of 70 μ in which a proportion of the respective layers was 20/60/20%. A haze, an impact strength, a maximum sealing strength, a blocking resistance and an interlayer strength of the film obtained were measured, and the measurement results thereof are shown in Table 6.

Comparative Example 8

The propylene block copolymer (B3) 100 parts by weight produced in Production Example 7 was mixed with 0.1 part by weight of the heat stabilizer IRGANOX 1010 (registered trade name of. Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 190° C. by means of the double screw extruding equipment (a same direction double screw kneading equipment) manufactured by Nakatani Machinery Co., Ltd. to prepare a pelletized polypropylene resin composition. This resin composition was a resin to be used for a heat sealing layer, an intermediate layer and a lami layer. The above resin composition was extruded by means of the three kind, three layers cast extruding equipment (65 mmϕ×3) equipped with a T die (die width: 800 mm, lip gap: 1.7 mm) of a feed block type manufactured by SHI Modern Machinery, Ltd., and it was used for the heat sealing layer, the intermediate layer and the lami layer on the conditions of a die set temperature of 230° C., a chill roll temperature of 30° C. and a processing speed of 50 m/minute to produce a three layer film having a thickness of 70 μ in which a proportion of the respective layers was 20/60/20%. A haze, an impact strength, a maximum sealing strength, a blocking resistance and an interlayer strength of the film obtained were measured, and the measurement results thereof are shown in Table 6.

Example 5

The propylene/ethylene block copolymer (A3) 100 parts by weight produced in Production Example 5 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 190° C. by means of the double screw extruding equipment (a same direction double screw kneading equipment) manufactured by Nakatani Machinery Co., Ltd. to prepare a pelletized polypropylene resin composition. It was a resin to be used for a heat sealing layer and a lami layer. The propylene block copolymer (B3) 100 parts by weight produced in Production Example 7 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 190° C. by means of the double screw extruding equipment (a same direction double screw kneading equipment) manufactured by Nakatani Machinery Co., Ltd. to prepare a pelletized polypropylene resin composition. It was a resin to be used for an intermediate layer. They were extruded by means of the three kind, three layers cast extruding equipment (65 mmϕ×3) equipped with a T die (die width: 800 mm, lip gap: 1.7 mm) of a feed block type manufactured by SHI Modern Machinery, Ltd. on the conditions of a die set temperature of 230° C., a chill roll temperature of 30° C. and a processing speed of 50 m/minute, wherein the resin composition containing the propylene/ethylene block copolymer (A3) was used for the heat sealing layer; the resin composition containing the propylene block copolymer (B3) was used for the intermediate layer; and the resin composition containing the propylene/ethylene block copolymer (A3) was used for the lami layer, whereby a three layer film having a thickness of 70 μ in which a proportion of the respective layers was 20/60/20% was produced. A haze, an impact strength, a maximum sealing strength, a blocking resistance and an interlayer strength of the film obtained were measured, and the measurement results thereof are shown in Table 6.

Example 6

The propylene/ethylene block copolymer (A3) 100 parts by weight produced in Production Example 5 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 190° C. by means of the double screw extruding equipment (a same direction double screw kneading equipment) manufactured by Nakatani Machinery Co., Ltd. to prepare a pelletized polypropylene resin composition. It was a resin to be used for a heat sealing layer and a lami layer. The propylene block copolymer (B3) 100 parts by weight produced in Production Example 7 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 190° C. by means of the double screw extruding equipment (a same direction double screw kneading equipment) manufactured by Nakatani Machinery Co., Ltd. to prepare a pelletized polypropylene resin composition. It was a resin to be used for an intermediate layer. They were extruded by means of the three kind, three layers cast extruding equipment (65 mmφ×3) equipped with a T die (die width: 800 mm, lip gap: 1.7 mm) of a feed block type manufactured by SHI Modern Machinery, Ltd. on the conditions of a die set temperature of 230° C., a chill roll temperature of 30° C. and a processing speed of 50 m/minute, wherein the resin composition containing the propylene/ethylene block copolymer (A3) was used for the heat sealing layer; the resin composition containing the propylene block copolymer (B3) was used for the intermediate layer; and the resin composition containing the propylene/ethylene block copolymer (A3) was used for the lami layer, whereby a three layer film having a thickness of 70 μ in which a proportion of the respective layers was 15/70/15% was produced. A haze, an impact strength, a maximum sealing strength, a blocking resistance and an interlayer strength of the film obtained were measured, and the measurement results thereof are shown in Table 6.

Example 7

The propylene/ethylene block copolymer (A3) 100 parts by weight produced in Production Example 5 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 190° C. by means of the double screw extruding equipment (a same direction double screw kneading equipment) manufactured by Nakatani Machinery Co., Ltd. to prepare a pelletized polypropylene resin composition. It was a resin to be used for a heat sealing layer. The propylene block copolymer (B3) 100 parts by weight produced in Production Example 7 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 190° C. by means of the double screw extruding equipment (a same direction double screw kneading equipment) manufactured by Nakatani Machinery Co., Ltd. to prepare a pelletized polypropylene resin composition. It was a resin to be used for an intermediate layer. The propylene/ethylene block copolymer (A4) 100 parts by weight produced in Production Example 6 was mixed with 0.1 part by weight of the heat stabilizer IRGANOX 1010 (registered trade name of Ciba Geigy Inc.), 0.1 part by weight of the heat stabilizer IRGAFOS 168 (registered trade name of Ciba Geigy Inc.) and 0.1 part by weight of calcium stearate by means of a tumbler. Then, the mixture was molten and kneaded at 190° C. by means of the double screw extruding equipment (a same direction double screw kneading equipment) manufactured by Nakatani Machinery Co., Ltd. to prepare a pelletized polypropylene resin composition. It was a resin to be used for a lami layer. They were extruded by means of the three kind, three layers cast extruding equipment (65 mmφ×3) equipped with a T die (die width: 800 mm, lip gap: 1.7 mm) of a feed block type manufactured by SHI Modern Machinery, Ltd. on the conditions of a die set temperature of 230° C., a chill roll temperature of 30° C. and a processing speed of 50 m/minute, wherein the resin composition containing the propylene/ethylene block copolymer (A3) was used for the heat sealing layer; the resin composition containing the propylene block copolymer (B3) was used for the intermediate layer; and the resin composition containing the propylene/ethylene block copolymer (A4) was used for the lami layer, whereby a three layer film having a thickness of 70 μ in which a proportion of the respective layers was 20/60/20% was produced. A haze, an impact strength, a maximum sealing strength, a blocking resistance and an interlayer strength of the film obtained were measured, and the measurement results thereof are shown in Table 6.

TABLE 3

| Measured items | | Example | | | |
|---|---|---|---|---|---|
| | | 1 | 2 | 3 | 4 |
| Constitution | Heat sealing layer | A2 (20) | A1 (15) | A2 (20) | A2 (30) |
| | Intermediate layer | B1 (60) | B1 (70) | B2 (60) | B2 (50) |
| | Lami layer | A2 (20) | A1 (15) | A2 (20) | A1 (20) |
| Haze (%) | | 5.5 | 5.8 | 6.1 | 5.8 |
| Impact strength (KJ/m), −10° C. | | 16 | 20 | 32 | 30 |
| Maximum sealing strength (N/15 mm) | | 29 | 26 | 29 | 29 |
| Interlayer strength (N/15 mm width) | | 50 | 45 | 47 | 49 |
| Blocking resistance (mN/cm) | | 55 | 70 | 95 | 85 |

*An inside of the parenthesis in Constitution shows a proportion (%) of a thickness of each layer to a whole thickness of the film.
Heat sealing layer: a heat sealing side (a side brought into contact with foods)
Lami layer: a side opposite to the heat sealing layer

TABLE 4

| Measured items | | Comparative Example | | |
|---|---|---|---|---|
| | | 1 | 2 | 3 |
| Constitution | Heat sealing layer | A2 (20) | B2 (20) | F-274NP (20) |
| | Intermediate layer | A2 (60) | B2 (60) | F-274NP (60) |
| | Lami layer | A2 (20) | B2 (20) | F-274NP (20) |
| Haze (%) | | 5.2 | 8.8 | 30 |
| Impact strength (KJ/m), −10° C. | | 9 | 35 | 25 |
| Maximum sealing strength (N/15 mm) | | 30 | 21 | 25 |
| Interlayer strength (N/15 mm width) | | 51 | 44 | 41 |
| Blocking resistance (mN/cm) | | 50 | 1400 | 6 |

*An inside of the parenthesis in Constitution shows a proportion (%) of a thickness of each layer to a whole thickness of the film.
Heat sealing layer: a heat sealing side (a side brought into contact with foods)
Lami layer: a side opposite to the heat sealing layer

TABLE 5

| Measured items | | Comparative Example | | |
|---|---|---|---|---|
| | | 4 | 5 | 6 |
| Constitution | Mingle layer | A2 | B2 | F-274NP |
| Haze (%) | | 5.0 | 8.0 | 29 |
| Impact strength (KJ/m), −10° C. | | 11 | 36 | 25 |
| Maximum sealing strength (N/15 mm) | | 32 | 22 | 26 |
| Interlayer strength (N/15 mm width) | | 53 | 45 | 47 |
| Blocking resistance (mN/cm) | | 50 | 1400 | 6 |

TABLE 6

| Measured items | | Comparative Example | | Example | | |
|---|---|---|---|---|---|---|
| | | 7 | 8 | 5 | 6 | 7 |
| Constitution | Heat sealing layer | A3 (20) | B3 (20) | A3 (20) | A3 (15) | A3 (20) |
| | Intermediate layer | A3 (60) | B3 (60) | B3 (60) | B3 (70) | B3 (60) |
| | Lami layer | A3 (20) | B3 (20) | A3 (20) | A3 (15) | A4 (20) |
| Haze (%) | | 4.8 | 7.8 | 5.1 | 5.2 | 5.0 |
| Film impact (KJ/m), −10° C. | | 11 | 35 | 25 | 30 | 32 |
| Maximum sealing strength (N/15 mm) | | 30 | 20 | 29 | 28 | 29 |
| Interlayer strength (N/15 mm width) | | 50 | 42 | 46 | 44 | 46 |
| Blocking resistance (mN/cm) | | 75 | 1800 | 80 | 88 | 82 |

* An inside of the parenthesis in Constitution shows a proportion (%) of a thickness of each layer to a whole thickness of the film.
Heat sealing layer: a heat sealing side (a side brought into contact with foods)
Lami layer: a side opposite to the heat sealing layer

INDUSTRIAL APPLICABILITY

The film for thermal sterilization packaging according to the present invention is suitably used for packages for retort foods such as curry and pasta sauce, particularly retort food packages in which contents can be confirmed. Further, it can be used not only as films for packaging retort foods but also as films for packaging medical products, particularly films for packaging infusion solutions or films for packaging medicines.

The invention claimed is:

1. A film for thermal sterilization packaging characterized by comprising:
   at least one outer layer containing a propylene/ethylene block copolymer (A) which has a melt flow rate (MFR; ASTM D1238, 230° C., load: 2.16 kg) in the range of 1 to 10 g/10 minutes and a melting point in the range of 150 to 170° C. measured by means of a differential scanning colorimeter (DSC) and which is constituted from 90 to 80% by weight of a part (Dinsol) insoluble in n-decane at room temperature satisfying the following items (1) to (3) and 10 to 20% by weight of a part (Dsol) soluble in n-decane at room temperature satisfying the following items (4) to (6) and
   at least one intermediate layer or an outer layer containing a propylene/ethylene block copolymer (B) which is not the same as the above propylene/ethylene block copolymer (A):
   (1) a molecular weight distribution (Mw/Mn) of Dinsol determined by GPC (gel permeation chromatography) is 3.5 or less,
   (2) a content of a skeleton originating in ethylene in Dinsol is less than 13 mole %,
   (3) a sum of a 2,1-insertion bond amount and a 1,3-insertion bond amount of propylene in Dinsol is 0.2 mole % or less,
   (4) a molecular weight distribution (Mw/Mn) of Dsol determined by GPC is 3.5 or less,
   (5) a limiting viscosity [η] of Dsol in 135° C. decalin is 1.5 to 4.0 dl/g and
   (6) a content of a skeleton originating in ethylene in Dsol is 15 to 35 mole %.

2. The film for thermal sterilization packaging as described in claim 1, wherein the propylene/ethylene block copolymer (B) has:
   a melt flow rate (MFR; ASTM D1238, 230° C., load: 2.16 kg) in the range of 1 to 10 g/10 minutes and
   a melting point in the range of 140 to 170° C., and it is constituted from:
   90 to 70% by weight of a part (Dinsol) insoluble in n-decane at room temperature which satisfies the following items (i) to (iii) and
   10 to 30% by weight of a part (Dsol) soluble in n-decane at room temperature which satisfies the following items (iv) to (vi):
   (i) a molecular weight distribution (Mw/Mn) of Dinsol determined by GPC (gel permeation chromatography) is 3.5 or less,
   (ii) a content of a skeleton originating in ethylene in Dinsol is less than 13 mole %,
   (iii) a sum of a 2,1-insertion bond amount and a 1,3-insertion bond amount of propylene in Dinsol is 0.2 mole % or less,
   (iv) a molecular weight distribution (Mw/Mn) of Dsol determined by GPC is 3.5 or less,
   (v) a limiting viscosity [η] of Dsol in 135° C. decalin is 1.5 to 4.0 dl/g and
   (vi) a content of a skeleton originating in ethylene in Dsol is 15 to 45 mole %.

3. The film for thermal sterilization packaging as described in claim 1, further satisfying the following item (a):
   (a) a content (mole %) of the skeleton originating in ethylene in Dsol of the propylene/ethylene block copolymer (B)>a content (mole %) of the skeleton originating in ethylene in Dsol of the propylene/ethylene block copolymer (A).

4. The film for thermal sterilization packaging as described in claim 1, comprising:
   the outer layer containing the propylene/ethylene block copolymer (A) and
   another outer layer containing the propylene/ethylene block copolymer (B).

5. The film for thermal sterilization packaging as described in claim 1, comprising:
   the outer layer containing the propylene/ethylene block copolymer (A),
   at least one intermediate layer containing the propylene/ethylene block copolymer (B) and
   another outer layer containing the propylene/ethylene block copolymer (A) or the propylene/ethylene block copolymer (B).

6. The film for thermal sterilization packaging as described in claim 1, wherein a haze measured according to ASTM D-1003 using a test piece of the film for thermal sterilization packaging having a thickness of 70 μm is 15% or less.

7. The film for thermal sterilization packaging as described in claim 1, wherein the propylene/ethylene block copolymer (A) and/or (B) are prepared by polymerization under the presence of a metallocene catalyst.

8. The film for thermal sterilization packaging as described in claim 2, further satisfying the following item (a):
(a) a content (mole %) of the skeleton originating in ethylene in $D_{sol}$ of the propylene/ethylene block copolymer (B)>a content (mole %) of the skeleton originating in ethylene in $D_{sol}$ of the propylene/ethylene block copolymer (A).

9. The film for thermal sterilization packaging as described in claim 2, comprising:
the outer layer containing the propylene/ethylene block copolymer (A) and
another outer layer containing the propylene/ethylene block copolymer (B).

10. The film for thermal sterilization packaging as described in claim 2, comprising:
the outer layer containing the propylene/ethylene block copolymer (A),
at least one intermediate layer containing the propylene/ethylene block copolymer (B) and
another outer layer containing the propylene/ethylene block copolymer (A) or the propylene/ethylene block copolymer (B).

11. The film for thermal sterilization packaging as described in claim 2, wherein a haze measured according to ASTM D-1003 using a test piece of the film for thermal sterilization packaging having a thickness of 70 μm is 15% or less.

12. The film for thermal sterilization packaging as described in claim 2, wherein the propylene/ethylene block copolymer (A) and/or (B) are prepared by polymerization under the presence of a metallocene catalyst.

13. The film for thermal sterilization packaging as described in claim 3, comprising:
the outer layer containing the propylene/ethylene block copolymer (A) and
another outer layer containing the propylene/ethylene block copolymer (B).

14. The film for thermal sterilization packaging as described in claim 4, wherein a proportion of a thickness of the outer layer containing the propylene/ethylene block copolymer (A) is 10 to 50%, and a proportion of a thickness of another outer layer containing the propylene/ethylene block copolymer (B) is 50 to 90% to a whole thickness of the film for thermal sterilization packaging (provided that the total of the proportions of the thicknesses of both layers is 100%).

15. The film for thermal sterilization packaging as described in claim 5, wherein a proportion of a thickness of the outer layer containing the propylene/ethylene block copolymer (A) is 10 to 30%; a proportion of a thickness (when two or more intermediate layers are present, a total thickness thereof) of the intermediate layer containing the propylene/ethylene block copolymer (B) is 40 to 80%; and a proportion of a thickness of another outer layer containing the propylene/ethylene block copolymer (A) or the propylene/ethylene block copolymer (B) is 10 to 30% to a whole thickness of the film for thermal sterilization packaging (provided that the total of the proportions of the thicknesses of all layers is 100%).

16. The film for thermal sterilization packaging as described in claim 8, comprising:
the outer layer containing the propylene/ethylene block copolymer (A) and
another outer layer containing the propylene/ethylene block copolymer (B).

17. The film for thermal sterilization packaging as described in claim 9, wherein a proportion of a thickness of the outer layer containing the propylene/ethylene block copolymer (A) is 10 to 50%, and a proportion of a thickness of another outer layer containing the propylene/ethylene block copolymer (B) is 50 to 90% to a whole thickness of the film for thermal sterilization packaging (provided that the total of the proportions of the thicknesses of both layers is 100%).

18. The film for thermal sterilization packaging as described in claim 13, wherein a proportion of a thickness of the outer layer containing the propylene/ethylene block copolymer (A) is 10 to 50%, and a proportion of a thickness of another outer layer containing the propylene/ethylene block copolymer (B) is 50 to 90% to a whole thickness of the film for thermal sterilization packaging (provided that the total of the proportions of the thicknesses of both layers is 100%).

19. The film for thermal sterilization packaging as described in claim 16, wherein a proportion of a thickness of the outer layer containing the propylene/ethylene block copolymer (A) is 10 to 50%, and a proportion of a thickness of another outer layer containing the propylene/ethylene block copolymer (B) is 50 to 90% to a whole thickness of the film for thermal sterilization packaging (provided that the total of the proportions of the thicknesses of both layers is 100%).

20. The film for thermal sterilization packaging as described in claim 10, wherein a proportion of a thickness of the outer layer containing the propylene/ethylene block copolymer (A) is 10 to 30%; a proportion of a thickness (when two or more intermediate layers are present, a total thickness thereof) of the intermediate layer containing the propylene/ethylene block copolymer (B) is 40 to 80%; and a proportion of a thickness of another outer layer containing the propylene/ethylene block copolymer (A) or the propylene/ethylene block copolymer (B) is 10 to 30% to a whole thickness of the film for thermal sterilization packaging (provided that the total of the proportions of the thicknesses of all layers is 100%).

* * * * *